(12) United States Patent
Mizumoto et al.

(10) Patent No.: US 7,098,264 B2
(45) Date of Patent: Aug. 29, 2006

(54) CONDUCTIVE ELASTOMER COMPOSITION, CONDUCTIVE MEMBER USING CONDUCTIVE ELASTOMER COMPOSITION, IMAGE-FORMING APPARATUS HAVING CONDUCTIVE MEMBER

(75) Inventors: Yoshihisa Mizumoto, Hyogo (JP); Takayuki Hattori, Hyogo (JP); Tetsuo Mizoguchi, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 191 days.

(21) Appl. No.: 10/704,906

(22) Filed: Nov. 12, 2003

(65) Prior Publication Data

US 2004/0106708 A1 Jun. 3, 2004

(30) Foreign Application Priority Data

Nov. 13, 2002 (JP) .............................. 2002-329922

(51) Int. Cl.
*H01B 1/06* (2006.01)

(52) U.S. Cl. ...................... 524/495; 524/430; 524/401; 429/56

(58) Field of Classification Search ................ 524/495, 524/401, 430; 429/56
See application file for complete search history.

(56) References Cited

U.S. PATENT DOCUMENTS

| 5,770,216 | A | * | 6/1998 | Mitchnick et al. | .......... | 428/402 |
| 5,940,662 | A | * | 8/1999 | Hano et al. | .................. | 399/175 |
| 6,319,181 | B1 | * | 11/2001 | Naoi et al. | ..................... | 492/56 |
| 6,444,323 | B1 | * | 9/2002 | Matsumoto et al. | ........ | 428/447 |

FOREIGN PATENT DOCUMENTS

| JP | 2001-214050 | * | 8/2001 |
| JP | 2001-214050 | A | | 8/2001 |
| JP | 2001-217009 | * | 8/2001 |
| JP | 2001-217009 | A | | 8/2001 |
| JP | 2002-226714 | * | 8/2002 |
| JP | 2002-226714 | A | | 8/2002 |

* cited by examiner

*Primary Examiner*—David W. Wu
*Assistant Examiner*—Henry S. Hu
(74) *Attorney, Agent, or Firm*—Birch, Stewart, Kolasch & Birch, LLP

(57) ABSTRACT

A conductive elastomer composition includes an ionic-conductive elastomer component, which contains an anion-containing salt having a fluoro group (F—) and a sulfonyl group (—$SO_2$—). The conductive elastomer composition has a volume charge not more than $10^{8.5}$ ($\Omega \cdot cm$) when the volume charge is measured at a voltage of 100V applied thereto in accordance with the method specified in JIS K6911. The conductive elastomer composition has a compression set not more than 30% when the compression set is measured at a temperature of 70° C. for 24 hours at a compressibility ratio of 25% in accordance with "the permanent set testing methods for rubber, vulcanized or thermoplastic" specified in JIS K6262.

12 Claims, 8 Drawing Sheets

CONDUCTIVE ELASTOMER COMPOSITION, CONDUCTIVE MEMBER USING CONDUCTIVE ELASTOMER COMPOSITION, IMAGE-FORMING APPARATUS HAVING CONDUCTIVE MEMBER

This nonprovisional application claims priority under 35 U.S.C. § 119(a) on Patent Application No(s). 2002-329922 filed in JAPAN on Nov. 13, 2002, which is(are) herein incorporated by reference.

BACKGROUND OF THE INVENTION

1. Field of the Invention

The present invention relates to a conductive elastomer composition, a conductive member such as a conductive roller and a conductive belt formed of the conductive elastomer composition, and an image-forming apparatus having the conductive member mounted therein.

More particularly, the present invention relates to the conductive elastomer composition which is used effectively for conductive rollers such as a development roller, a charging roller, a transfer roller, and a toner supply roller; and for conductive belts such as a transfer belt. The conductive rollers and the conductive belts are used in the image-forming apparatus such as a copying machine, a printer, a facsimile, and the like. In particular, the present invention provides the conductive elastomer composition which is ionic-conductive and has a much lower electric resistance than the conventional one.

2. Description of the Related Art

It is necessary to allow conductive members such as the charging roller, the development roller, the toner supply roller, the transfer roller, and the transfer belt used in the image-forming apparatus such as the copying machine, the printer, the facsimile, and the like to have an appropriate stable electric resistance value. As a method of allowing the conductive roller and the conductive belt to be conductive, the following two methods have been used: In one of the methods, an electroconductive elastomer composition containing a conductive filler such as powder of metal oxides or carbon black is used; and in the other method, an ionic-conductive elastomer composition such as urethane rubber, acrylonitrile-butadiene rubber (NBR), and epichlorohydrin rubber is used.

In the case where the electroconductive elastomer composition containing the conductive filler is used, the electric resistance thereof changes rapidly in a semi-conductive region owing to a slight change of an addition amount of the conductive filler. Thus it is very difficult to control the electric resistance thereof. In addition, because it is difficult to disperse the conductive filler uniformly in the elastomer composition, the electric resistance value has variations in the circumferential and longitudinal directions of the conductive roller and inside the conductive belt. Further the electric resistance value of the conductive roller and the conductive belt composed of the electroconductive elastomer composition depends on a voltage applied thereto and is not constant. The electroconductive elastomer composition containing carbon black shows this phenomenon outstandingly.

Thus as the recent tendency, the ionic-conductive elastomer composition is used rather than the electroconductive elastomer composition in the copying machine, the printer and the like required to form a high-image quality by using digital image processing technique and color image processing technique.

However, it is difficult for the conventional art to reduce the electric resistance value by using only the ionic-conductive elastomer. Thus addition of an ionic-conductive filler to the ionic-conductive elastomer component is proposed. For example, addition of metal ions and a quaternary ammonium salt to the ionic-conductive elastomer component are proposed because only the ionic-conductive elastomer composition such as urethane or NBR makes the electric resistance value too high. In addition, other proposals have been made.

For example, in Japanese Patent Application Laid-Open Nos. 2001-214050 and 2001-217009, there are disclosed a crosslinked polymeric solid electrolytic wall made of a conductive polymeric composition consisting of a copolymer containing ethylene oxide at a polymerization ratio not less than 85% and a salt of lithium ions such as a lithium imide salt added to the copolymer.

In Japanese Patent Application Laid-Open No. 2002-226714, there is disclosed a polymeric electricity control rubber composition containing various elastomers and a specified amount of metal salts added thereto with the intermediary of a specific compound.

However, the conductive polymeric composition disclosed in each of Japanese Patent Application Laid-Open Nos. 2001-214050 and 2001-217009 is used for the wall of a battery. Since the polymerization ratio of ethylene oxide is not less than 85%, the conductive polymeric composition has a low water resistance and thus can be used in only a closed system such as the battery. That is, the conductive polymeric composition cannot be used for products such as the conductive roller, the conductive belt, and the like that are used in an open system having normal temperature and humidity. Since the polymerization ratio of the ethylene oxide is so high that the conductive polymeric composition has a high hardness or deterioration in its compression set. Thus it is difficult to use the conductive polymeric composition for general products or the conductive roller and conductive belt.

The polymeric electricity control rubber composition disclosed in Japanese Patent Application Laid-Open No. 2002-226714 contains the specific low-molecular weight compound serving as a medium. Thus it does not have any problems so long as it is used for general-purpose rubber products. However, there is room for improvement in its compression set, stain of a photosensitive member, and the material cost in applying the electric resistance control rubber composition to products such as the conductive roller, the conductive belt, and the like for use in the copying machine, the printer, and the like.

There is a possibility that some kind of additives such as metal ions, quaternary ammonium salts, and the like deteriorate the compression set of the ionic-conductive elastomer composition or stain the photosensitive member and are incapable of reducing the electric resistance value of the ionic-conductive elastomer composition sufficiently. The additives such as the urethane, NBR, and the like have a high electric resistance value. Thus the use of these additives do not contribute to realization of such a low volume specific resistance value as that specified by the present invention. Therefore these additives are unsuitable for conductive members for use in the copying apparatus, the printer, and the like.

It is conceivable that the ionic-conductive elastomer composition having a lower electric resistance value than the urethane contains ionic-conductive additives such as metal ions and quaternary ammonium salts. But this method does not necessarily provide a sufficiently low electric resistance value because in dependence on the amount and kind of the ionic-conductive additive, there is much possibility that the property of the ionic-conductive elastomer composition such as its compression set may be deteriorated and the ionic-conductive additive causes stain of the photosensitive member. In dependence on the mixing amount and kind of the salt, electric resistance value of the ionic-conductive elastomer composition increases much in successive energization and cannot be put into practical use.

In addition, the conductive members installed on printers of various types are demanded to have various properties besides having a low electric resistance value: They are demanded to have favorable mechanical properties such as sufficient wear resistance and strength. Further when they are used in an electrophotographic system, the conductive members for charging toner and a photosensitive drum are demanded to have appropriate electrostatic property on the surfaces thereof. It is difficult to compose the rubber layer of the conductive member of only one ionic-conductive elastomer. Thus it is necessary to optimize the properties of the rubber layer by adding various elastomers to comply with performance demanded in dependence on use.

However, in the case where the above elastomers is added to the ionic-conductive elastomer obtained by the conventional art to impart the above-described demanded properties to the ionic-conductive elastomer composition, the conductive member composed of the mixture has a high electric resistance value. Therefore the elastomers are mixed with the ionic-conductive elastomer in a range in which the mixture satisfies a predetermined electric resistance value. Consequently the mixture is low in its strength and wear resistance.

The development roller and the charging roller are the central component part of a printer which forms images by utilizing a static electricity. Thus it is necessary to charge toner and the photosensitive member sufficiently. In addition, the development roller and the charging roller are demanded to have a low electric resistance value in terms of the construction of the printer. Therefore a sufficient amount of elastomers cannot be added to the ionic-conductive elastomer, as described above. Thus it is impossible to adjust the electrostatic property of the surface of the development roller, the charging roller, and the like appropriately. Consequently the toner and the photosensitive member cannot be sufficiently charged and hence an appropriate image cannot be obtained. Accordingly image deterioration occurs during the early stages in a long-term use of the printer.

SUMMARY OF THE INVENTION

The present invention has been made in view of the above-described problems. Therefore it is a first object of the present invention to provide a conductive elastomer composition which does not have variations in electric resistance value, is capable of realizing a lower electric resistance value than conventional conductive elastomer compositions, and has a proper hardness without deteriorating properties thereof such as a compression set and the like.

It is a second object of the present invention to provide conductive members such as a conductive roller, a conductive belt, and a conductive blade, composed of the conductive elastomer composition, which can be suitably used as a transfer roller, a charging roller, a transfer belt, a cleaning blade, and the like for use in a color copying machine or a color printer.

To achieve the object, according to a first aspect of the present invention, the present invention provides a conductive elastomer composition including an ionic-conductive elastomer component to which an anion-containing salt having a fluoro group (F—) and a sulfonyl group (—SO$_2$—) is added.

The conductive elastomer composition has a volume change not more than $10^{6.9}$($\Omega$·cm) when the volume change is measured at a voltage of 100V applied thereto in accordance with the method specified in JIS K6911. The conductive elastomer composition has a compression set not more than 30% when the compression set is measured at a temperature of 70° C. for 24 hours at a compressibility ratio of 25% in accordance with "the permanent set testing methods for rubber, vulcanized or thermoplastic" specified in JIS K6262. The conductive elastomer composition has a hardness not more than 75 degrees when the hardness is measured by a durometer of type E specified in JIS K6253.

The present inventors have formed a large number of ionic-conductive additives and energetically studied various components to be mixed with one another and mixing ratios by making experiments. As a result, they have found that by adding the anion-containing salt having the fluoro group (F—) and the sulfonyl group (—SO$_2$—) to the ionic-conductive elastomer component, the anion-containing salt having the fluoro group (F—) and the sulfonyl group (—SO$_2$—) shows a very high dissociation degree and a high solubility in the ionic-conductive elastomer component. Therefore the conductive elastomer composition is capable of obtaining a very high conduction degree. Thereby the volume change thereof can be reduced and the properties thereof such as the compression set and the hardness can be prevented from deteriorating.

Therefore unlike the conventional ionic-conductive elastomer composition, it is possible to obtain the conductive elastomer composition having a very low electric resistance value and a low compression set. Thus a roller or a belt composed of the conductive elastomer composition has a proper degree of hardness. That is, the conductive roller and the conductive belt of the present invention have a very low volume change and favorable properties (low compression set and hardness). Thereby power consumption can be reduced and a high-quality image having uniform density can be obtained.

Supposing that elastomers are added to the base component of the polymer component having a low ionic conduction to allow a conductive member to be practically used and that the obtained conductive elastomer composition has a high electric resistance, the anion-containing salt having the fluoro group (F—) and the sulfonyl group (—SO$_2$—) is added to the polymer component to set the volume change of the obtained conductive elastomer composition to not more than $10^{6.9}$($\Omega$·cm).

The volume change of the conductive elastomer composition is set to not more than $10^{6.9}$($\Omega$·cm) when the volume change is measured at a voltage of 100V applied thereto in accordance with the method specified in JIS K6911. This is for the following reason: If the volume change of the conductive elastomer composition is more than $10^{6.9}$($\Omega$·cm), the development roller, the charging roller, and the like of the copying apparatus, the printer, and the like are composed of the ionic-conductive elastomer, toner and a photosensitive member are charged at a low efficiency. Thus the development roller, the charging roller, and the like cannot be put into practical use. For example, let it be supposed that the conductive elastomer composition is used for the development roller. In this case, when toner charged by the development roller having a large electric resistance value is transported to the photosensitive member from the development roller, a voltage drop is large. As a result, an electric field having the difference between the electric potential of the development roller and that of the photosensitive member becomes small. Thus an image formation cannot be made as designed. In the case where the ionic-conductive elastomer is used for the charging roller, it is necessary to apply a very large voltage to the charging roller if its volume change is larger than the above-described value. Thus the charging roller cannot be put into practical use.

The lower the volume change, the better. But the lower limit of the volume change of the conductive elastomer composition is favorably about $10^{5.0}$($\Omega$·cm) and more favorably not less than $10^{6.0}$($\Omega$·cm). The volume change of the conductive elastomer composition is measured by applying a voltage of 100V thereto at a constant temperature of 23° C. and a constant relative humidity of 55% in accordance with the method specified in JIS K6911.

According to the second aspect of the present invention, there is provided a conductive elastomer composition having a volume change not more than $10^{8.5}$($\Omega$·cm), when the volume change is measured at a voltage of 100V applied thereto in accordance with the method specified in JIS K6911. The conductive elastomer composition has a compression set not more than 30% when the compression set is measured at a temperature of 70° C. for 24 hours at a compressibility ratio of 25% in accordance with "the permanent set testing methods for rubber, vulcanized or thermoplastic" specified in JIS K6262.

The conductive elastomer composition of the second invention containing two or more blended elastomers has a comparatively low volume resistivity of $10^{8.5}$($\Omega$·cm) and a high charging characteristic. Thus in practical use, the hardness of the conductive elastomer composition is not limited to the above-described range.

The hardness of the conductive elastomer composition of the second invention should be not less than 40 degrees nor more than 88 degrees when its hardness is measured by the durometer of type E specified in JIS K6253. To obtain dimensional stability of the nip and a high electric conduction, the hardness of the conductive elastomer composition is favorably not less than 45 degrees nor more than 85 degrees, more favorably not less than 50 degrees nor more than 80 degrees, and most favorably not less than 50 degrees nor more than 70 degrees. To obtain the above-described preferable hardness, it is very advantageous to use the conductive elastomer composition of the first invention.

The conductive elastomer composition formed in this manner has a low volume change not more than $10^{8.5}$($\Omega$·cm) when necessary various elastomers are mixed with the components of the conductive elastomer composition. Thus as described above, the addition of the anion-containing salt having the fluoro group (F—) and the sulfonyl group (—SO$_2$—) to the polymer component is very useful in mixing various elastomers with the ionic-conductive elastomer to impart a proper electrostatic property to the surface of the development roller and the charging roller. In the case where various elastomers are mixed with the ionic-conductive elastomer obtained by the conventional art, the obtained conductive elastomer composition has a high electric resistance. Thus the conductive roller and the like composed of the elastomer composition cannot be practically used. But the conductive elastomer composition of the present invention can be formed as the conductive roller that can be practically used. Therefore the present invention provides conductive rollers having superior charging characteristic.

In the conductive elastomer composition of present invention, the above-described salt is added to the ionic-conductive elastomer component without the intermediary of polyether compounds such as low molecular weight (molecular weight: several hundreds to several thousands) polyethylene glycol, polypropylene glycol, and polyether polyol; and polar compounds such as low molecular weight polyester polyol, adipate, and phthalic ester. Therefore the conductive elastomer composition does not give rise to bleed or transfer contamination. The conductive roller and the like composed of the conductive elastomer composition does not stain the photosensitive member of the copying machine and the printer.

It is conceivable to dissolve and disperse the above-described salt in polyether polyol or polyester polyol having a low molecular weight (not more than 10,000) and make the mixture react with an isocyanate compound to form polyurethane having a low electric resistance value. But because all low molecular weight polyols are incapable of reacting with the isocyanate compound, there is a fear that the photosensitive member is stained. Thus the conductive elastomer composition of the present invention is superior in that the above-described salt can be dispersed in the polyether polyol or the polyester polyol without using the low molecular weight compound which causes the photosensitive member to be stained and that the conductive elastomer composition has a low electric resistance value. Further, in case of two or more elastomer are blended, the conductive elastomer composition has a volume change not more than $10^{8.5}$ without adding low moleculare weight component.

As described above, the compression set of the conductive elastomer composition is not more than 30%, more favorably not more than 25%, and most favorably not more than 20%, when the compression set is measured at a temperature of 70° C. for 24 hours at a compressibility ratio of 25% in accordance with "the permanent set testing methods for rubber, vulcanized or thermoplastic" specified in JIS K6262. It is favorable to set the compression set of the development roller and the charging roller used or transported in contact with the photosensitive member to not more than 10%.

If the value of the compression set is more than 30%, the dimensional change of the conductive roller and the conductive belt composed of the conductive elastomer composition is so large that they cannot be put into practical use. In addition, an image-forming system has a problem in its durability and maintenance of accuracy.

The lower limit of the compression set is favorably not less than 1% to optimize a vulcanizing condition and allow a reliable mass production to be accomplished.

The conductive elastomer composition has a hardness not more than 75 degrees when the hardness is measured by the durometer of type E specified in JIS K6253. This is because the softer the conductive elastomer composition of the present invention, the larger the nip, which allows transfer, charging, and development to be efficiently accomplished. In addition, it is possible to reduce mechanical damage to other members such as the photosensitive member of the printer or the like. The softer the conductive elastomer composition, the better. But when the conductive elastomer composition is solid, the hardness of the conductive elastomer composition is favorably not less than 40 degrees nor more than 70 degrees and more favorably not less than 50 degrees nor more than 70 degrees when the conductive elastomer composition is solid.

The conductive elastomer composition of the present invention has a volume change less than 50%, when the conductive elastomer composition is immersed in distilled water at 40±1° C. for 22±0.25 hours in accordance with JIS K6258.

Thereby the conductive elastomer composition is allowed to secure high resistance to water. Thus the conductive elastomer composition is capable of keeping high performance at a room temperature and a normal humidity.

It is preferable that the conductive elastomer composition contains not less than 5 nor more than 100 wt % of the ionic-conductive elastomer component for 100 wt % thereof. By setting the wt % of the ionic-conductive elastomer component to the above range, the conductive elastomer composition is allowed to have a low volume change. In order for the conductive elastomer composition to obtain a low electric resistance, it is most favorable that the conductive elastomer composition contains about 100 wt % of the ionic-conductive elastomer component for 100 wt % thereof. In the case where other polymers are added to the ionic-conductive elastomer component to stabilize production of the conductive elastomer composition, it is preferable that the conductive elastomer composition contains not less than 90 nor more than 95 wt % of the ionic-conductive elastomer component for 100 wt % thereof. To control the characteristic of the conductive elastomer composition such as the electrostatic property, the conductive elastomer composition contains favorably not less than 5 nor more than 80 wt % of the ionic-conductive elastomer component for 100 wt % thereof, more favorably not less than 10 nor more than 50 wt %, and most favorably not less than 10 nor more than 30 wt %.

It is preferable to use a bipolymer of an epihalohydrin-ethylene oxide or a terpolymer of epihalohydrin-ethylene oxide-allyl glycidyl ether as the ionic-conductive elastomer component.

That is, it is favorable to use epihalohydrin rubber consisting of epihalohydrin, ethylene oxide, and allyl glycidyl ether copolymerized at the ratio of 10 to 45 mol %, 55 to 80 mol %, and 0 to 10 mol % respectively.

The above-described copolymerization ratio is set for the reason described below to obtain the above-described volume change without deteriorating the properties (compression set and hardness) of the conductive elastomer composition.

That is, the terpolymer of the epihalohydrin-ethylene oxide-allyl glycidyl ether displays the ionic conduction when oxonium ions and positive metal ions (for example, positive ions such as lithium ions contained in added salt, nickel ions contained in age resistor for polymer) in the terpolymer are stabilized by the ethylene oxide unit and transported by the motion of the segment of the molecular chain at the stabilized portion. Thus the higher the copolymerization ratio of the ethylene oxide is, the more ions are stabilized, which allows the conductive elastomer composition to have a low electric resistance value.

However, if the copolymerization ratio of the ethylene oxide is too high, crystallization of the ethylene oxide occurs, which prevents the segment motion of the molecular chain from being made. Consequently the volume specific resistance value increases. The crystallization of the ethylene oxide also causes increase of the hardness and deterioration of the compression set. To suppress the crystallization of the ethylene oxide, the copolymerization ratio of the ethylene oxide is set to not more than 80 mol %. If the copolymerization ratio of the ethylene oxide is less than 55 mol %, the stabilization of the ions is insufficient. Thereby the effect of reducing the volume change is low.

If the copolymerization ratio of the ethylene oxide is more than 80 mol %, the conductive elastomer composition has affinity for water to a very high extent. Thereby the conductive elastomer composition is liable to change in its configuration and its water resistance owing to moisture absorption. Thus it is difficult to use the conductive elastomer composition in environment having the normal temperature and humidity. In this case, the conductive elastomer composition is unsuitable for the use thereof intended by the present invention. Further if the copolymerization ratio of the ethylene oxide is more than 80 mol %, the conductive elastomer composition becomes tacky. Consequently the conductive roller and the conductive belt composed of the conductive elastomer composition may stain the photosensitive member. It is more favorable that the copolymerization ratio of the ethylene oxide is not less than 65 mol % nor more than 75%.

If the copolymerization ratio of the epihalohydrin is more than 45 mol %, the copolymerization ratio of the ethylene oxide cannot be set to not less than 55 mol %, which makes it difficult to obtain the effect of the ethylene oxide. On the other hand, if the copolymerization ratio of the epihalohydrin is less than 10 mol %, the copolymerization ratio of the ethylene oxide cannot be set to not more than 80 mol %, which causes the above-described problem to occur. It is more favorable to set the copolymerization ratio of the epihalohydrin to not more than 15 mol % nor more than 35 mol %.

It is favorable to use a terpolymer of the epichlorohydrin-ethylene oxide-allyl glycidyl ether as the ionic-conductive elastomer component. That is, epichlorohydrin is used as the epihalohydrin. Because the epichlorohydrin can be produced easily, the terpolymer of the epichlorohydrin-ethylene oxide-allyl glycidyl ether can be easily obtained. By copolymerizing the epichlorohydrin, the ethylene oxide, and the allyl glycidyl ether at the above-described ratio, the conductive elastomer composition is allowed to have a low electric resistance.

The copolymerization of the allyl glycidyl ether with the epihalohydrin and the ethylene oxide allows crosslinking to be accomplished. Thereby the conductive elastomer composition hardly bleeds or stains the photosensitive member and is allowed to have rubber-like elasticity. That is, the conductive elastomer composition has improved property. The allyl glycidyl ether unit itself obtains a free volume as the side chain. Thus it is possible to control the crystallization of the ethylene oxide. Thus the conductive elastomer composition is capable of realizing a much lower electric resistance than that obtained by the conventional art.

If the copolymerization ratio of the allyl glycidyl ether exceeds 10 mol %, the number of crosslinking points increases after vulcanization is performed, which makes it difficult to realize a low electric resistance. Further the conductive elastomer composition is liable to have deteriorated tensile strength, fatigue characteristic, and flexing resistance. It is favorable to set the copolymerization ratio of the allyl glycidyl ether to not less than 2 mol %. If the copolymerization ratio of the allyl glycidyl ether is less than 2 mol %, bleeding, stain of the photosensitive member, and crystallization of the ethylene oxide are liable to occur. Thus it is difficult to allow the conductive elastomer composition to have a low electric resistance value. Further it is difficult to make the vulcanization speed high, which deteriorates the productivity the conductive elastomer composition.

By copolymerizing the allyl glycidyl ether with the epihalohydrin and the ethylene oxide, it is possible to suppress the crystallization of ethylene oxide and reduce the volume specific resistance value. The copolymerization of the allyl glycidyl ether with the epihalohydrin and the ethylene oxide also allows introduction of the double bond of carbon atoms. Thereby crosslinking of the terpolymer with other rubbers can be made. By co-crosslinking the terpolymer with other rubbers, it is possible to prevent bleeding from occurring and the photosensitive member from being stained. It is also possible to increase the molecular weight of the conductive elastomer composition and thus prevent the bleeding and the stain of the photosensitive member to a higher extent.

It is favorable that the conductive elastomer composition contains not less than 0.01 nor more than 20 parts by weight of the anion-containing salt having the fluoro group (F—) and the sulfonyl group (—$SO_2$—) for 100 parts by weight of an entire polymer component containing the ionic-conductive elastomer component.

If the conductive elastomer composition contains less than 0.01 parts by weight of the salt for 100 parts by weight of the entire polymer component, the effect of improving the conductance can be hardly obtained. On the other hand, if the conductive elastomer composition contains more than 20 parts by weight of the salt for 100 parts by weight thereof, the material cost increases although the conductance of the conductive elastomer composition is improved.

The conductive elastomer composition contains the salt having the fluoro group (F—) and the sulfonyl group (—$SO_2$—) at more favorably not less than 0.2 nor more than 10 parts by weight and at more favorably not less than 0.4 nor more than 6 parts by weight for 100 parts by weight of the entire polymer component.

It is preferable that the anion-containing salt having the fluoro group (F—) and the sulfonyl group (—$SO_2$—) includes at least one salt selected from among a salt of bisfluoroalkylsulfonylimide, a salt of tris(fluoroalkylsulfonyl)methane, and a salt of fluoroalkylsulfonic acid.

In the above-described salts, anions are stable because the electric charge are not localized owing to a strong electron attraction effect. Thus the salts show a high degree of dissociation in a polyethylene oxide and allow the conductive elastomer composition to have a very high ionic conductance. It is possible to realize a low electric resistance efficiently by using the anion-containing salt having the fluoro group (F—) and the sulfonyl group (—$SO_2$—). Thus by appropriately adjusting the mixing ratio of the polymer component, the conductive elastomer composition is capable of maintaining a low electric resistance and suppressing the stain of the photosensitive member.

Lithium salts are preferable as the anion-containing salt having the fluoro group (F—) and the sulfonyl group (—$SO_2$—) Salts of the alkali metals, the group 2A metals, and other metals may be used as the anion-containing salt having the fluoro group (F—) and the sulfonyl group (—$SO_2$—). The conductive elastomer composition may contain salts having cations shown by the following formulas 1 and 2. The reference symbols $R_1$ through $R_6$ show alkyl group having 1 to 20 carbon atoms or its derivatives. $R_1$ through $R_4$ may be identical to or different from each other. Similarly, $R_5$ and $R_6$ may be identical to or different from each other. It is particularly preferable to use a salt containing trimethyl-type quaternary ammonium cations consisting of three of $R_1$ through $R_6$ and one alkyl group or its derivative having favorably 4 to 20 carbon atoms and more favorably 6 to 20 carbon atoms. This is because three methyl groups, having strong electron-donating property, of the salt is capable of stabilizing the positive electric charge of nitrogen atoms. In addition, the alkyl group or its derivative is capable of improving compatibility of the salt with the ionic-conductive elastomer component. In the cations shown by the chemical formula 2, it is preferable that $R_5$ or $R_6$ consists of methyl group or ethyl group because the alkyl group or its derivatives $R_5$ or $R_6$ having a stronger electron-donating property is capable of stabilizing the positive electric charge of nitrogen atoms. By stabilizing the positive electric charge of the nitrogen atoms, it is possible to increase the degree of stability of the cations and thereby form salts having a higher dissociation degree and superior conductance-imparting performance.

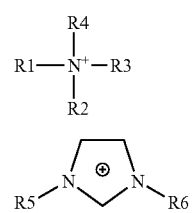

Chemical formula 1

Chemical formula 2

As the anion-containing salt having the fluoro group (F—) and the sulfonyl group (—$SO_2$—), $LiCF_3SO_3$, $LiN(SO_2CF_3)_2$, $LiC(SO_2CF_3)_3$, $LiCH(SO_2CF_3)_3$, and $LiSF_5CF_2SO_3$ can be used.

It is preferable that the anion-containing salt having the fluoro group (F—) and the sulfonyl group (—$SO_2$—) is dispersed uniformly in the elastomer component. Of the above-described salts, the salt of bisfluoroalkylsulfonylimide such as $LiN(SO_2CF_3)_2$ is preferable because it has a high solubility in the chain of the polyethylene oxide and is capable of plasticizing the chain of the polyethylene oxide. Thus by adding the salt having the fluoro group (F—) and the sulfonyl group (—$SO_2$—) to the ionic-conductive elastomer component, it is possible to reduce the hardness of the conductive elastomer composition and reduce the dependence of the volume specific resistance value on environment. In particular, lithium-bis(trifluoromethanesulfonyl) imide ($LiN(SO_2CF_3)_2$) can be readily dispersed in the elastomer component by adding it directly to ionic-conductive rubber such as epihalohydrin rubber. Thereby it is possible to reduce the compression set of the conductive elastomer composition without adversely affecting the hardness thereof. Thus the lithium-bis(trifluoromethanesulfonyl) imide can be preferably used.

As the ionic-conductive elastomer component, it is possible to use the terpolymer of the epichlorohydrin-ethylene oxide-allyl glycidyl ether singly or a mixture of chloroprene rubber and the terpolymer of the epichlorohydrin-ethylene oxide-allyl glycidyl ether. By using the terpolymer of the epichlorohydrin-ethylene oxide-allyl glycidyl ether in combination with chloroprene rubber, it is possible to easily control the electric resistance value of the conductive elastomer composition and the vulcanizing speed. Since the chloroprene rubber is used as a general-purpose rubber and inexpensive, the material cost can be reduced. To obtain a low volume change, it is preferable to set the weight ratio between the terpolymer of the epichlorohydrin-ethylene oxide-allyl glycidyl ether and the chloroprene rubber to 50:50 to 100:0.

One or more of the following rubbers can be mixed with the terpolymer of the epichlorohydrin-ethylene oxide-allyl glycidyl ether: acrylonitrile butadiene rubber, ethylene-propylene-diene terpolymer (EPDM), natural rubber, isoprene rubber, stylene-butadiene rubber, butyl rubber, and acrylic rubber.

It is preferable to crosslink the terpolymer of the epichlorohydrin-ethylene oxide-allyl glycidyl ether with sulfur and thiourea derivatives or with the sulfur and triazine derivatives or crosslink the mixture of chloroprene rubber and the epichlorohydrin-ethylene oxide-allyl glycidyl ether with the sulfur and the thiourea derivatives or with the sulfur and the triazine derivatives. Thereby it is possible to adjust the crosslinking speed, the compression set, and the electric resistance value to a necessary level respectively by making use of the advantage of each crosslinking system and selecting the mixing ratio between the sulfur and the thiourea derivatives and the mixing ratio between the sulfur and the triazine derivatives. In forming a roller composed of a foamed material, it is possible to greatly suppress reduction of the vulcanizing speed and reduction of crosslinking density caused by the use of a foaming agent. Thereby it is possible to obtain the roller composed of the foamed material having a high strength and a very favorable shape.

As the thiourea derivatives, one or a plurality of thiourea derivatives can be selected from among the group of tetramethylthiourea, trimethylthiourea, ethylenethiourea, and thiourea derivatives indicated by $(C_nH_{2n+1}NH)_2C=S$ (n=integers 1 to 10).

As the triazine derivatives, one or a plurality of compounds can be selected from among the group of 2,4,6-trimelcapto-S-triazine, 2-dialkylamino-4,6-dimelcapto-S-triazine. In terms of the vulcanizing speed, the 2-dialkylamino-4,6-dimelcapto-S-triazine is preferable.

A proper mixing ratio between the sulfur and the thiourea and between the sulfur and the triazine derivatives can be selected in dependence on the kind of an accelerator.

More specifically, the sulfur is mixed with the entire polymer component containing the ionic-conductive elastomer component at favorably not less than 0.1 nor more than 5.0 parts by weight and at more favorably not less than 0.2 nor more than 2 parts by weight for 100 parts by weight of the entire polymer component.

If less than 0.1 parts by weight of the sulfur is mixed with 100 parts by weight of the entire polymer component, the entire polymer component is crosslinked at a low speed, and hence the productivity is low. On the other hand, if more than 5.0 parts by weight of the sulfur is mixed with 100 parts by weight of the entire polymer component, there is a possibility that the conductive elastomer composition has a high compression set and that the sulfur and the accelerator bloom.

The thiourea derivatives are mixed with the polymer component at favorably not less than 0.0009 mol nor more than 0.0800 mol and at more favorably not less than 0.0015 mol nor more than 0.0400 mol for 100 g of the entire polymer component.

The triazine derivatives is mixed with the polymer component at favorably not less than 0.0004 mol nor more than 0.0500 mol and at more favorably not less than 0.0010 mol nor more than 0.0300 mol for 100 g of the entire polymer component.

By using the thiourea derivatives and the triazine derivatives in the above range for 100 g of the polymer component, it is possible to make the vulcanization tight and suppress blooming and stain of the photosensitive member. Further the molecular motion is not prevented much. Thus the conductive elastomer composition is capable of obtaining a low electric resistance and improving its dynamic property such as the compression set.

When the conductive elastomer composition is formed into a roller or a belt from foams 2, 3, and 6 by adding a foaming agent thereto, it is possible to reduce crosslinking inhibition which is caused by the foaming agent and obtain a sufficiently high vulcanizing speed in practical use. The foams 2, 3, and 6 will be described later with reference to FIG. 6.

It is preferable to mix the sulfur and the thiourea derivatives at a weight ratio of 5:1 to 1:8. It is preferable to mix the sulfur and the triazine derivatives at a weight ratio of 3:1 to 1:2.

To improve the dependence of the electric resistance value of the conductive elastomer composition of the present invention on environment, it may contain a proper amount of an ionic-conductive agent such as carbon black and conductive zinc so long as the ionic conduction thereof does not deteriorate completely.

In performing successive vulcanization, it is suitable to use the thiourea derivatives, the sulfur in combination with thiourea derivatives, and the sulfur in combination with the triazine derivatives because an appropriately short scorch time is required.

In addition to using the conductive elastomer composition of the present invention as the vulcanized rubber, it can be used as a thermoplastic elastomer composition by dynamically crosslinking it. In this case, as the matrix resin, polyamide thermoplastic elastomer or thermoplastic polyurethane can be preferably used.

A part of cations generated from the anion-containing salt having the fluoro group (F—) and the sulfonyl group (—$SO_2$—) is single-ionized to stabilize the conduction of the conductive elastomer composition and improve its conduction when a small amount of the salt is added to the ionic-conductive elastomer component. It is favorable to single-ionize not less than 0.5% of the cations. Thereby it is possible for the conductive elastomer composition to obtain a stable conduction to a higher extent and a lower electric resistance value owing to the addition of a smaller amount of the metal salt to the ionic-conductive elastomer component. It is more favorable to single-ionize not less than 1% nor more than 20% of the cations.

Single ionization means that an ion adsorbent adsorbs cations or anions generated by dissociation of the salt and thereby cations or anions not adsorbed can move comparatively freely in a system.

To make the vulcanizing speed high, it is preferable to use a sulfur vulcanizing system, a vulcanizing system using the sulfur and the thiourea derivatives in combination or a vulcanizing system using the sulfur and the triazine derivatives in combination. It is preferable to use hydrotalcite to suppress the stain of the photosensitive member. Vulcanization can be performed by known methods. For example, the vulcanization can be performed in a vulcanizing can pressurized by water vapor. A secondary vulcanization may be performed as necessary. It is possible to carry out a successive vulcanization method in dependence on a mixing ratio.

Hydrotalcite is added to a halogen-containing polymer at favorably not less than 1 nor more than 15 parts by weight and at more favorably not less than 2 nor more than 10 parts by weight for 100 parts by weight of the halogen-containing polymer. The hydrotalcite serving as a acid-receiving agent captures halogen-caused ions generated when the halogen-containing polymer such as epihalohydrin rubber is vulcanized, thus preventing vulcanization from being inhibited and the photosensitive member from being stained. The hydrotalcite is favorable in its dispersibility. Thus owing to the addition of the hydrotalcite to the halogen-containing polymer, the property of the conductive elastomer composition is hardly affected by a kneading state or processing.

The present invention provides conductive members such as the conductive roller and the conductive belt composed of the conductive elastomer composition.

The conductive elastomer composition of the present invention is superior in that it has a low volume change, a low compression set, and a low hardness. Thus the conductive roller composed of the conductive elastomer composition has a low electric resistance value. Consequently the conductive roller can be suitably used as rollers, for a color printer or the like, required to have a low electric resistance value. The rollers include a transfer roller, a charging roller, a toner supply roller, and a development roller; and a transfer belt.

The conductive elastomer composition of the present invention can be formed by using two or more kinds of elastomer components containing electrostatic property-imparting elastomers. Thus the conductive elastomer composition can be suitably used as the charging roller for charging the photosensitive member and the development roller for charging toner and transporting an electrostatic latent image formed on the photosensitive member.

Therefore it is possible to design the conductive roller and the conductive belt having desired performance at a very high degree of freedom.

The conductive roller can be produced by conventional methods. For example, the conductive elastomer composition (kneaded components) is preformed tubularly with a single-axis extruder. Then the preform is vulcanized at 160° C. for 15–70 minutes. Thereafter a core metal is inserted into a hollow portion of the vulcanized tube. After the surface of the tube is polished, the tube is cut to a predetermined size to obtain a roller. An optimum vulcanizing time period should be set by using a vulcanization testing rheometer (for example, Curelastometer). The vulcanization temperature may be set around 160° C. in dependence on necessity. To suppress the stain of the photosensitive member and reduce the compression set of the conductive elastomer composition, it is preferable to set conditions of the vulcanization temperature and the vulcanization time period so that sufficient vulcanization can be accomplished. In order for the conductive roller composed of the conductive elastomer to have a low electric resistance value specified in the present invention, the electric resistance value thereof is favorably not less than $10^{3.5}\Omega$ nor more than $10^{5.5}\Omega$ and more favorably not less than $10^{4.0}\Omega$ nor more than $10^{5.0}\Omega$ when a voltage of 100V is applied thereto.

The conductive belt can be produced by conventional methods. That is, the conductive elastomer composition (kneaded components) is extruded into the shape of a belt by an extruder. Then the preform is vulcanized at 160° C. for 15–70 minutes. The vulcanization temperature may be set around 160° C. in dependence on necessity.

The electric resistance value of the conductive roller such as the development roller and the charging roller is favorably not less than $10^{5.0}\Omega$ nor more than $10^{7.0}\Omega$ and more favorably not less than $10^{5.0}\Omega$ nor more than $10^{6.5}\Omega$, when a voltage of 100V is applied thereto so that the conductive roller has favorable electrostatic property. If the electric resistance thereof is smaller than $10^{5.0}\Omega$, too much electric current flows therethrough and hence a defective image is liable to be formed. Further there is a possibility of discharge to the photosensitive member. On the other hand, if the electric resistance value thereof is larger than $10^{7.0}\Omega$, toner is inefficiently supplied to the photosensitive member and thus the conductive roller is unsuitable for practical use. Further when the toner is transferred to the photosensitive member, the development roller has a voltage drop, which prevents reliable transport of the toner from the development roller to the photosensitive member. Consequently a defective image is formed.

As described above, the dielectric loss tangent of the conductive roller of the present invention is set to 0.1 to 1.5. The dielectric loss tangent which is one of the electrical characteristics of the rubber roller means an index indicating the flowability of electricity (dielectric constant) and the degree of influence of a capacitor component (electrostatic capacity). In other words, the dielectric loss tangent is a parameter indicating a phase delay when an alternating current is applied to the development roller, namely, the rate of the capacitor component (electrostatic capacity) when a voltage is applied to the rubber roller. That is, the dielectric loss tangent of the rubber roller is indicated by a charged quantity of toner generated when the toner contacts the development roller through an amount regulation blade at a high voltage and by a charged quantity thereof which escapes to he development roller before the toner is transported to the photosensitive member. Therefore, the dielectric loss tangent is an index indicating the charged quantity of the toner immediately before the toner contacts the photosensitive member. When the dielectric loss tangent is large, it is easy to flow electricity (electric charge) through the rubber roller, which makes the progress of polarization slow. On the other hand, when the dielectric loss tangent is small, it is not easy to flow electricity therethrough, which makes the progress of polarization high.

Therefore the rubber roller having a small dielectric loss tangent is capable of having a capacitor-like property and maintaining the charge of the toner generated by a frictional charge without allowing escape of the charge of the toner from the rubber roller. That is, the rubber roller is capable of imparting electrostatic property to the toner and maintaining the imparted electrostatic property. To obtain the effect, the dielectric loss tangent is set to favorably less than 1.5 and more favorably not less than 0.1 nor more than 1.0.

To prevent the conductive elastomer composition from becoming hard owing to increase of a filler or prevent its surface from being deteriorated by formation of an excessively thick oxide film, the dielectric loss tangent of the conductive rubber roller is set to not less than 0.1.

It is favorable the conductive member such as the conductive roller and the conductive belt composed of the conductive elastomer composition has a surface roughness Rz not less than 1 μm nor more than 8 μm; and a surface friction coefficient in the range from 0.1 to 1.5.

The reason the surface roughness Rz of the conductive member is set to not less than 1 μm nor more than 8 μm is as follows: If the surface roughness Rz of the conductive member is set to less than 8 μm, small irregularities having a diameter less than the diameter of the toner are present on the surface of the conductive roller and the conductive belt. Thereby the toner can be transported uniformly and has a favorable flowability. Consequently it is possible to impart electrostatic property at a very high efficiency. On the other hand, if the surface roughness Rz thereof is set to more than 8 μm, toner having a diameter about 10 μm is difficult to separate from the conductive roller and the conductive belt. Further if the toner having the diameter about 10 μm is reused, the toner may adhere to the conductive roller and the conductive belt. If the surface roughness Rz thereof is set to less than 1 μm, the conductive roller and the conductive belt are incapable of transporting the toner sufficiently. As a result, printing dot is unstable. It is more favorable that the surface roughness Rz of the conductive member is set to not less than 2 μm nor more than 5 μm.

The surface roughness Rz of the conductive member is measured in conformity to JIS B0601 (1994).

The reason the surface friction coefficient of the conductive member is set to 0.1 to 1.5 is as follows: If the surface friction coefficient thereof exceeds 1.5, it is impossible to reduce a stress such as a shear force to which toner is subjected between the development roller and the toner supply roller as well as the amount regulation blade. Further separation of the toner from the development roller is unfavorable, which causes deterioration of the toner in long-time (durable) use. On the other hand, if the surface friction coefficient thereof is less than 0.1, the toner slips and thus a sufficient amount of the toner cannot be transported, which causes printing density low.

It is preferable that the surface of the conductive member consists of an oxide film. It is preferable that the oxide film has C=O groups and C—O groups. The oxide film serves as a means for charging the toner sufficiently. Further the oxide film functions as a dielectric layer, thus preventing escape of the electric charge. Thus the oxide film is effective for reducing the friction coefficient and adjusting the dielectric loss tangent of the conductive member.

It is favorable that the oxide film is formed on the surface of the conductive by irradiating the surface with ultraviolet rays and/or ozone. The ultraviolet rays are more favorable than the ozone because the formation of the oxide film by using the former takes shorter period of time and costs lower. The processing for forming the oxide film can be performed by using known methods. For example, the surface of the conductive should be irradiated with the ultraviolet rays having a wavelength of favorably 100 nm to 400 nm and more favorably 100 nm to 200 nm for 30 seconds to 30 minutes and favorably 1 to 10 minutes, although the wavelength varies according to the distance between the surface of the conductive and an ultraviolet ray irradiation lamp and according to the kind of rubber. The intensity of the ultraviolet rays and the irradiation condition (time period, temperature in bath, distance) are selected according to the dielectric loss tangent and the friction coefficient specified in the present invention.

The present invention provides an image-forming apparatus having the conductive member such as the conductive roller, the conductive belt, and the like formed of the conductive elastomer composition of the present invention.

As the conductive roller, it is possible to list a charging roller for uniformly charging a photosensitive drum, a development roller for charging toner and transporting it to the photosensitive member, a transfer roller for transferring a toner image from the photosensitive member to paper or an intermediate transfer belt, and a toner supply roller for transporting the toner. As the conductive belt, it is possible to list a transfer belt, an intermediate transfer belt, and a fixing belt. The toner and the photosensitive member are charged or discharged by bringing the surface of the conductive member into contact therewith. The image-forming apparatus such as a copying machine, a printer, a facsimile, and the like have preferable electrical characteristics because the conductive member of the present invention is installed therein. Thus the image-forming apparatus has small power consumption, thus providing uniform images for a long time.

As apparent from the foregoing description, according to the present invention, the anion-containing salt having the fluoro group (F—) and the sulfonyl group (—SO$_2$—) is added to the ionic-conductive elastomer component providing uniform and stable electric resistance. Therefore the conductive elastomer composition is capable of obtaining a very high conduction degree. Thus although the conductive elastomer composition is ionic-conductive, it has a very low volume specific resistance value and a low compression set. Further the conductive elastomer composition has a hardness suitable for composing the conductive roller and the conductive belt.

The predetermined parts by weight of the anion-containing salt having the fluoro group (F—) and the sulfonyl group (—SO$_2$—) is added to the ionic-conductive elastomer component, namely, the epichlorohydrin-ethylene oxide-allyl glycidyl ether copolymerized at the required ratio. The predetermined parts by weight of the anion-containing salt having the fluoro group (F—) and the sulfonyl group (—SO$_2$—) is added to the mixture of the epichlorohydrin-ethylene oxide-allyl glycidyl ether and the chloroprene having a lower conductivity than the epichlorohydrin-ethylene oxide-allyl glycidyl ether or/and the mixture of the epichlorohydrin-ethylene oxide-allyl glycidyl ether and the nonionic elastomer. Thus the conductive elastomer composition of the present invention has a low volume change.

As apparent from the foregoing description, the conductive elastomer composition of the present invention has a low electric resistance which cannot be realized by the conventional one. Thus it can be used for various uses. More specifically, the charging roller, the development roller, the toner supply roller, the conductive belt, and the like composed of the conductive elastomer composition have small power consumption and contribute to formation of preferable images having uniform density. The conductive elastomer composition can be used suitably for composing the conductive roller and the conductive belt such as the charging roller, the development roller, the toner supply roller, the transfer belt, and the transfer roller for use in a color copying apparatus and a color printer. This is because the conductive elastomer composition has a comparatively low electric resistance. Therefore the present invention provides image-forming apparatuses such as the copying apparatus, the printer, the facsimile, and the like that have small power consumption and provide preferable and high-quality images having uniform density reliably for a long time.

DETAILED DESCRIPTION OF THE PREFERRED EMBODIMENTS

Figure 1:
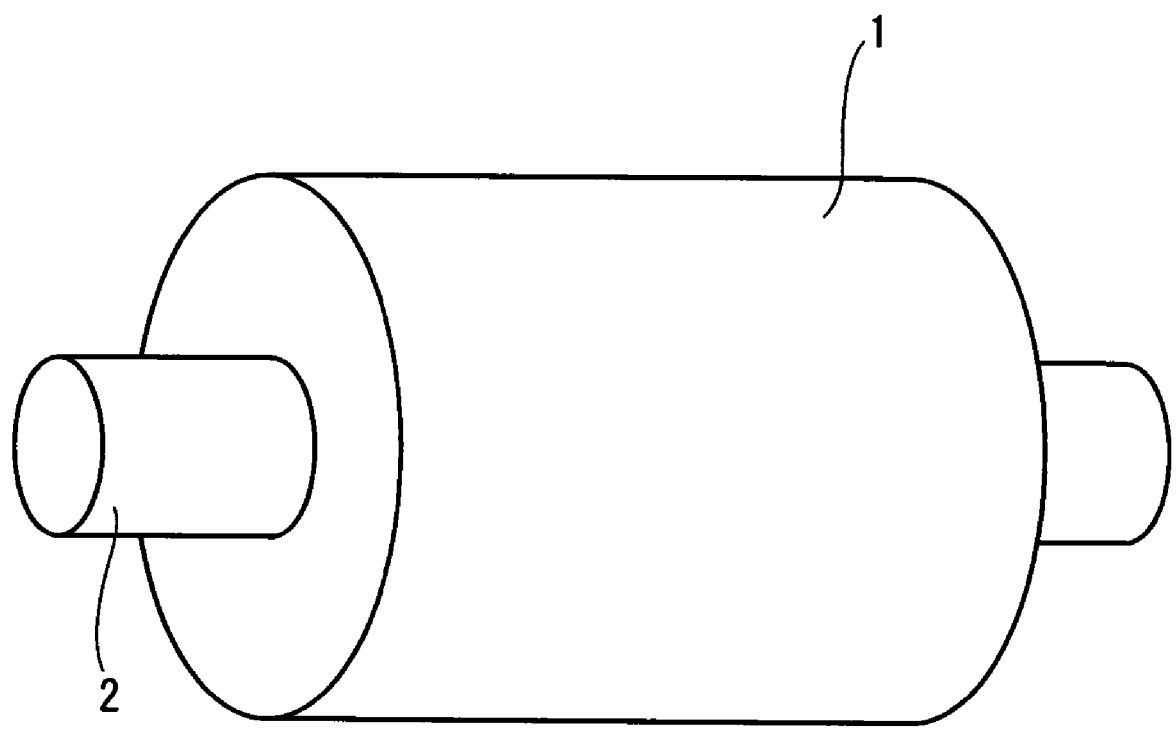
FIG. 1 is a schematic view showing a conductive roller of the present invention.

The embodiments of the present invention will be described below with reference to the drawings.

To form the ionic-conductive elastomer component, epichlorohydrin (hereinafter referred to as EP), ethylene oxide (hereinafter referred to as EO), and allyl glycidyl ether (hereinafter referred to as AGE) copolymerized at the ratio of 23 mol %, 73 mol %, and 4 mol % respectively is used as the epihalohydrin rubber consisting of epihalohydrin, ethylene oxide, and allyl glycidyl ether copolymerized at the ratio of 10 to 45 mol %, 55 to 80 mol %, and 0 to 10 mol % respectively.

As the anion-containing salt having the fluoro group (F—) and the sulfonyl group (—$SO_2$—), two parts by weight of the lithium-bis(trifluoromethanesulfonyl)imide is added to 100 parts by weight of the epichlorohydrin rubber.

The elastomer component serving as the base component consists of the epichlorohydrin rubber. Thus the anion-containing salt having the fluoro group (F—) and the sulfonyl group (—$SO_2$—) is dispersed uniformly in the base component without using the low molecular weight polyether compound or the low molecular weight polar compound disclosed in Japanese Patent Application Laid-Open No. 2002-226714.

After a vulcanizing agent, a vulcanizing accelerator, and additives (inorganic filler, hydrotalcite, zinc oxide, stearic acid) are added to the elastomer component, all the components are fused and kneaded by using a known rubber kneading apparatus such as an open roll and an enclosed kneader. Thereafter the polymer component is vulcanized to obtain a conductive elastomer composition.

When all the additives and the elastomer component are mixed with one another uniformly by the kneading, the anion-containing salt having the fluoro group (F—) and the sulfonyl group (—$SO_2$—) may be added to the mixture. Thereafter the mixture is kneaded to uniformly disperse the anion-containing salt having the fluoro group (F—) and the sulfonyl group (—$SO_2$—) in the elastomer component. Alternatively, it is possible to prepare a master batch containing the polymer component such as epichlorohydrin rubber into which the anion-containing salt having the fluoro group (F—) and the sulfonyl group (—$SO_2$—) and the additives have been kneaded to obtain desired rubber.

It is preferable to use a master batch containing not less than 1 wt % nor more than 40 wt % of the anion-containing salt having the fluoro group (F—) and the sulfonyl group (—$SO_2$—) in the case where the addition amount of the anion-containing salt having the fluoro group (F—) and the sulfonyl group (—$SO_2$—) is as small as less than one part by weight. Thereby it is possible to prevent deviation of a predetermined concentration.

The formed conductive elastomer composition has a volume change $10^{6.6}$($\Omega \cdot cm$), when the volume change is measured at a voltage of 100V applied thereto in accordance with the method specified in JIS K6911. The conductive elastomer composition has a compression set of 30% when the compression set is measured at a temperature of 70° C. for 24 hours at a compressibility ratio of 25% in accordance with "the permanent set testing methods for rubber, vulcanized or thermoplastic" specified in JIS K6262. The conductive elastomer composition has a hardness of 75 degrees when the hardness is measured by the durometer of type E specified in JIS K6253.

Thereby it is possible to maintain the volume specific resistance value and compression set of the conductive elastomer composition at a low value respectively and make the rubber roller and the rubber belt composed of the conductive elastomer composition have an appropriate hardness.

As shown in FIG. 1, a conductive roller 1 composed of the conductive elastomer composition is formed. The conductive roller 1 is approximately cylindrical. A core metal is inserted into a hollow portion of the conductive roller 1.

A kneaded mixture of all the components is taken out from a kneader as an elastomer composition in the form of a ribbon. The elastomer composition is introduced into an extruder to extrude it as a hollow tube. The tube is cut to a proper length. Thereafter the cut tube is vulcanized at a required temperature for a required time period to obtain a vulcanized rubber tube. A core metal is inserted into the hollow portion of the rubber tube. Thereafter the surface of the rubber tube is polished to obtain the conductive roller 1.

In the embodiment, the conductive roller is constructed as a charging roller. However, the conductive roller may be constructed as a transfer roller, a development roller or a toner supply roller. In addition, a foamed roller can be formed by adding foaming agents to the base component.

Figure 2:
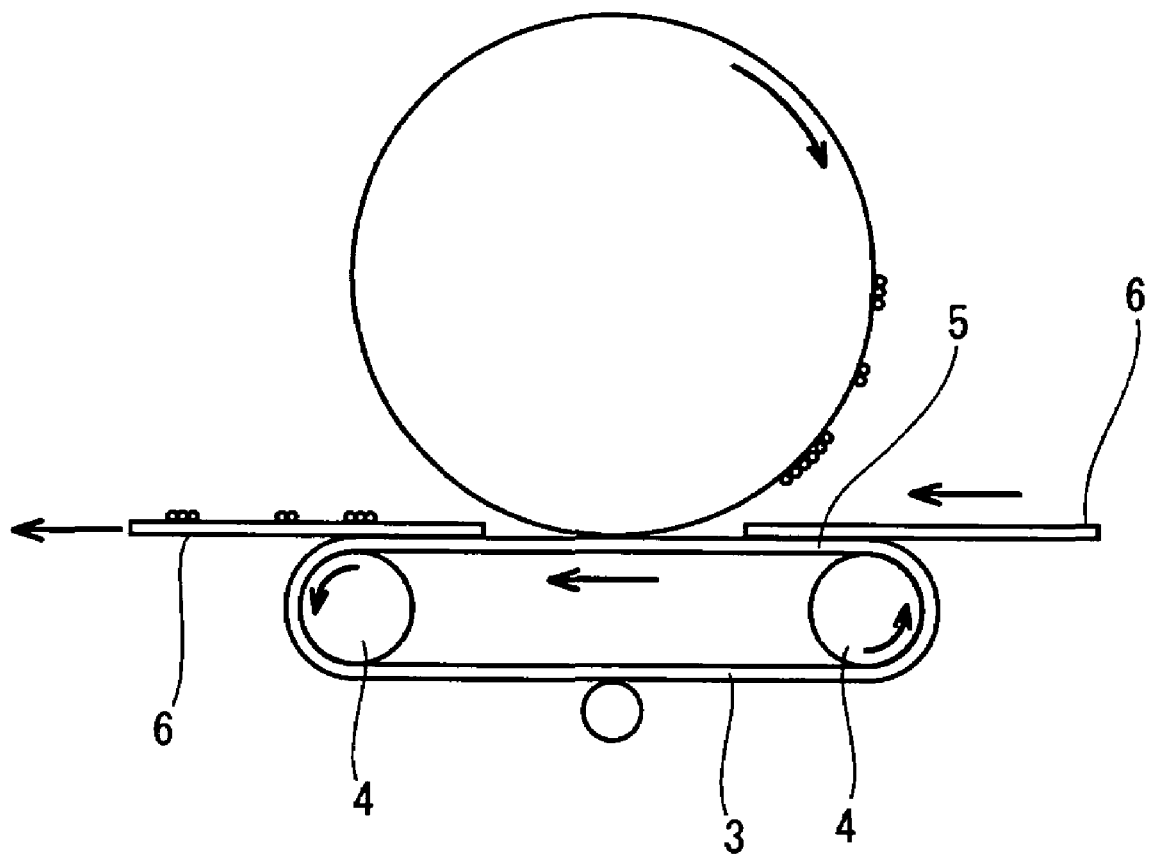
FIG. 2 is a schematic view showing a conductive belt of the present invention.

As shown in FIG. 2, a conductive belt 3 such as a transfer belt is produced from the conductive elastomer composition. The conductive belt 3 is tight-stretched by two or more pulleys 4. The conductive belt 3 serves as a means for delivering a sheet 6 such as paper and a toner image by movably holding it on a straight portion 5 thereof disposed at its upper side. The conductive belt 3 transfers toner to paper from a photosensitive member in dependence on a case.

As image-forming apparatus in which the conductive member of the present invention such as the conductive roller and the conductive belt is mounted, it is possible to exemplify a color printer having a transfer roller, a charging roller, a photosensitive member, an intermediate transfer belt, a fixing roller, toner, a mirror, and a cleaning blade; and a monochromatic printer using a transfer roller and a development roller. In addition, the conductive member of the present invention can be used for image-forming apparatuses such as a copying apparatus, a printer, a facsimile, and the like.

The examples of the present invention and comparison examples will be described below.

The components mixed at the mixing ratio shown in tables 1 and 2 were kneaded to compose a solid conductive roller of the conductive elastomer composition of each of the examples 1 through 11 of the present invention and comparison examples 1 through 6.

A kneaded mixture containing the components was taken out from a kneader as an elastomer composition in the form of a ribbon. The elastomer composition was introduced into a roller head extruder to extrude it in the shape of a sheet. The sheet-shaped elastomer composition was supplied to a die to perform press vulcanization therefor at 160° C. for a required time period to obtain a slab sheet for evaluating property of the conductive elastomer composition of each of the examples 1 through 11 and the comparison examples 1 through 6 and a specimen for measuring the compression set and the hardness thereof.

TABLE 1-1

| Components | Component (name=trade name & maker) | | E1 | E2 | E3 | E4 |
|---|---|---|---|---|---|---|
| Epichlorohydrin rubber 1 (EP:EO:AGE = 23:73:4, Mn = 130000, Mw = 580000) | (Trial product) | | 100 | 100 | 100 | 100 |
| Epichlorohydrin rubber 2 (EP:EO = 39:61) | Epichlomer D | Daiso | | | | |
| Inorganic filler 1 | Calcium carbonate light | Maruo Calcium Kabushiki Kaisha | 20 | 20 | 20 | 20 |
| Hydrotalcite-like compound | DHT-4A-2 | Kyowa Kagaku Kogyo Kabushiki Kaisha | 3 | 3 | 3 | 3 |
| Magnesium oxide | Magsarat 150ST | Kyowa Kagaku Kogyo Kabushiki Kaisha | | | | |
| Zinc oxide | Two kinds of zinc oxide | Mitsui Kinzoku Kabushiki Kaisha | 5 | 5 | 5 | 5 |
| Stearic acid | 4931 | Unichema Australia | 1 | 1 | 1 | 1 |
| Lithium-bis (trifluoromethanesulfonyl) imide | | | 2 | 11 | 2 | 11 |
| Lithium trifluoromethanesulfonate | | | | | | |
| Lithium-tris (trifluoromethanesulfonyl) methane | | | | | | |
| ion-adsorbing agent | | | | | | |
| Vulcanizing agent 1 | Powdered sulfur | Tsurumi Kagaku Kogyo Kabushiki Kaisha | 1.5 | 1.5 | | |
| Vulcanizing accelerator 1 | Nocceler DM | Ouchi Shinko Kagaku Kogyo Kabushiki Kaisha | 1.5 | 1.5 | | |
| Vulcanizing accelerator 2 | Nocceler TS | Ouchi Shinko Kagaku Kogyo Kabushiki Kaisha | 0.5 | 0.5 | | |
| Vulcanizing agent 2 | Accel 22-S | Kawaguchi Kagaku Kogyo Kabushiki Kaisha | | | 2.0 | 2.0 |
| Vulcanizing accelerator 3 | Nocceler DT | Ouchi Shinko Kagaku Kogyo Kabushiki Kaisha | | | 1.7 | 1.7 |
| Vulcanizing agent 3 | Actor BSH | Kawaguchi Kagaku Kogyo Kabushiki Kaisha | | | | |
| Hardness | | | 70 | 66 | 71 | 69 |
| Roller electric resistance value $\log_{10}R(\Omega)$ | | | 4.8 | 4.4 | 4.5 | 4.1 |
| Volume specific resistance $\log_{10}R(\Omega \cdot cm)$ | | | 6.6 | 6.3 | 6.4 | 6.2 |
| Compression set (%) | | | 29 | 27 | 7 | 8 |
| Stain of photosensitive member | | | ○ | ○ | ○ | ○ |
| Cost | | | ○ | △ | ○ | △ |
| Resistance to water (ΔV(distilled water) (%)/determination) | | | 30/○ | 33/○ | 28/○ | 32/○ |

| Components | Component (name=trade name & maker) | | E5 | E6 | E7 | E8 |
|---|---|---|---|---|---|---|
| Epichlorohydrin rubber 1 (EP:EO:AGE = 23:73:4, Mn = 130000, Mw = 580000) | (Trial product) | | 100 | 100 | 100 | 100 |
| Epichlorohydrin rubber 2 (EP:EO = 39:61) | Epichlomer D | Daiso | | | | |
| Inorganic filler 1 | Calcium carbonate light | Maruo Calcium Kabushiki Kaisha | 20 | 20 | 20 | 20 |
| Hydrotalcite-like compound | DHT-4A-2 | Kyowa Kagaku Kogyo Kabushiki Kaisha | 3 | 3 | 3 | 3 |
| Magnesium oxide | Magsarat 150ST | Kyowa Kagaku Kogyo Kabushiki Kaisha | | | | |
| Zinc oxide | Two kinds of zinc oxide | Mitsui Kinzoku Kabushiki Kaisha | 5 | 5 | 5 | 5 |
| Stearic acid | 4931 | Unichema Australia | 1 | 1 | 1 | 1 |
| Lithium-bis (trifluoromethanesulfonyl) imide | | | | | | |
| Lithium trifluoromethanesulfonate | | | 11 | 11 | 11 | |
| Lithium-tris (trifluoromethanesulfonyl) methane | | | | | | 2 |
| ion-adsorbing agent | | | | | 3 | |
| Vulcanizing agent 1 | Powdered sulfur | Tsurumi Kagaku Kogyo Kabushiki Kaisha | 1.5 | | | 1.5 |
| Vulcanizing accelerator 1 | Nocceler DM | Ouchi Shinko Kagaku Kogyo Kabushiki Kaisha | 1.5 | | | 1.5 |
| Vulcanizing accelerator 2 | Nocceler TS | Ouchi Shinko Kagaku Kogyo Kabushiki Kaisha | 0.5 | | | 0.5 |
| Vulcanizing agent 2 | Accel 22-S | Kawaguchi Kagaku Kogyo Kabushiki Kaisha | | 2.0 | 2.0 | |
| Vulcanizing accelerator 3 | Nocceler DT | Ouchi Shinko Kagaku Kogyo Kabushiki Kaisha | | 1.7 | 1.7 | |
| Vulcanizing agent 3 | Actor BSH | Kawaguchi Kagaku Kogyo Kabushiki Kaisha | | | | |
| Hardness | | | 68 | 70 | 70 | 70 |
| Roller electric resistance value $\log_{10}R(\Omega)$ | | | 4.9 | 4.6 | 4.2 | 4.1 |
| Volume specific resistance $\log_{10}R(\Omega \cdot cm)$ | | | 6.7 | 6.5 | 6.2 | 6.2 |
| Compression set (%) | | | 27 | 6 | 5 | 27 |
| Stain of photosensitive member | | | ○ | ○ | ○ | ○ |
| Cost | | | ○ | ○ | ○ | △ |
| Resistance to water (ΔV(distilled water) (%)/determination) | | | 34/○ | 33/○ | 31/○ | 31/○ |

TABLE 1-1-continued

| Components | Component (name=trade name & maker) | | E9 | E10 | E11 |
|---|---|---|---|---|---|
| Epichlorohydrin rubber 1 (EP:EO:AGE = 23:73:4, Mn = 130000, Mw = 580000) | (Trial product) | | 100 | 100 | |
| Epichlorohydrin rubber 2 (EP:EO = 39:61) | Epichlomer D | Daiso | | | 100 |
| Inorganic filler 1 | Calcium carbonate light | Maruo Calcium Kabushiki Kaisha | 20 | 20 | 20 |
| Hydrotalcite-like compound | DHT-4A-2 | Kyowa Kagaku Kogyo Kabushiki Kaisha | 3 | | 3 |
| Magnesium oxide | Magsarat 150ST | Kyowa Kagaku Kogyo Kabushiki Kaisha | | 3 | |
| Zinc oxide | Two kinds of zinc oxide | Mitsui Kinzoku Kabushiki Kaisha | 5 | 5 | 5 |
| Stearic acid | 4931 | Unichema Australia | 1 | 1 | 1 |
| Lithium-bis (trifluoromethanesulfonyl) imide | | | 2 | 2 | 2 |
| Lithium trifluoromethanesulfonate | | | | | |
| Lithium-tris (trifluoromethanesulfonyl) methane | | | | | |
| ion-adsorbing agent | | | | | |
| Vulcanizing agent 1 | Powdered sulfur | Tsurumi Kagaku Kogyo Kabushiki Kaisha | 0.50 | 1.00 | |
| Vulcanizing accelerator 1 | Nocceler DM | Ouchi Shinko Kagaku Kogyo Kabushiki Kaisha | 0.50 | 1.00 | |
| Vulcanizing accelerator 2 | Nocceler TS | Ouchi Shinko Kagaku Kogyo Kabushiki Kaisha | 0.17 | 0.88 | |
| Vulcanizing agent 2 | Accel 22-S | Kawaguchi Kagaku Kogyo Kabushiki Kaisha | 1.33 | | 2.0 |
| Vulcanizing accelerator 3 | Nocceler DT | Ouchi Shinko Kagaku Kogyo Kabushiki Kaisha | 1.13 | | 1.7 |
| Vulcanizing agent 3 | Actor BSH | Kawaguchi Kagaku Kogyo Kabushiki Kaisha | | 1.06 | |
| Hardness | | | 71 | 71 | 71 |
| Roller electric resistance value $\log_{10}R(\Omega)$ | | | 4.9 | 4.8 | 4.9 |
| Volume specific resistance $\log_{10}R(\Omega \cdot cm)$ | | | 6.7 | 6.6 | 6.7 |
| Compression set (%) | | | 23 | 22 | 3 |
| Stain of photosensitive member | | | ○ | ○ | ○ |
| Cost | | | ○ | ○ | ○ |
| Resistance to water (ΔV(distilled water) (%)/determination) | | | 29/○ | 30/○ | 25/○ | where E denotes example.

TABLE 2-1

| Components | Component (name=trade name & maker) | | CE1 | CE2 | CE3 | CE4 | CE5 | CE6 |
|---|---|---|---|---|---|---|---|---|
| Epichlorohydrin rubber 1 (EP:EO:AGE = 23:73:4, Mn = 130000, Mw = 580000) | (Trial product) | | 100 | | 100 | 100 | 100 | |
| Epichlorohydrin rubber 2 (EP:EO = 39:61) | Epichlomer D | Daiso Kabushiki Kaisha | | | | | | |
| Epichlorohydrin rubber 3 (EP:EO:AGE = 63:34.5:2.5) | Epichlomer CG104 | Daiso Kabushiki Kaisha | | 100 | | | | |
| EP-PO-AGE copolymer (EP:PO:AGE = 90:4:6, Mn = 80000, Mw = 400000) | ZSN8030 | Zeon | | | | 100 | | 100 |
| Inorganic filler 1 | Calcium carbonate light | Maruo Calcium Kabushiki Kaisha | 20 | 20 | 20 | 20 | 20 | 20 |
| Hydrotalcite-like compound | DHT-4A-2 | Kyowa Kagaku Kogyo Kabushiki Kaisha | 3 | 3 | 3 | 3 | 3 | 3 |
| Zinc oxide | Two kinds of zinc oxide | Mitsui Kinzoku Kabushiki Kaisha | 5 | 5 | 5 | 5 | 5 | 5 |
| Stearic acid | 4931 | Unichema Australia | 1 | 1 | 1 | 1 | 1 | 1 |
| Lithium-bis (trifluoromethanesulfonyl) imide | | | | 11 | | | 2 | |
| Non-chlorine quaternary ammonium salt | KP4729 | Kao Kabushiki Kaisha | | | | 2 | | |
| Quaternary ammonium perchlorate | A-902 | Nippon Carlit Kabushiki Kaisha | | | | | | |
| High-performance ionic-conductive additive | | | | | | | 2 | |
| Vulcanizing agent 1 | Powdered sulfur | Tsurumi Kagaku Kogyo | 1.5 | 1.5 | 1.5 | 1.5 | 1.5 | 1.5 |
| Vulcanizing accelerator 1 | Nocceler DM | Ouchi Shinko Kagaku Kogyo Kabushiki Kaisha | 1.5 | 1.5 | 1.5 | 1.5 | 1.5 | 1.5 |
| Vulcanizing accelerator 2 | Nocceler TS | Ouchi Shinko Kagaku Kogyo Kabushiki Kaisha | 0.5 | 0.5 | 0.5 | 0.5 | 0.5 | 0.5 |
| Vulcanizing agent 2 | Accel 22-S | Kawaguchi Kagaku Kogyo Kabushiki Kaisha | | | | | | |
| Vulcanizing accelerator 3 | Nocceler DT | Ouchi Shinko Kagaku Kogyo | | | | | | |
| Hardness | | | 72 | 72 | 73 | 74 | 72 | 83 |
| Roller electric resistance value $\log_{10}R(\Omega)$ | | | 7.2 | 5.6 | 5.9 | 4.1 | 4.8 | 4.9 |
| Volume specific resistance $\log_{10}R(\Omega \cdot cm)$ | | | 8.3 | 7.1 | 7.3 | 6.2 | 6.6 | 6.7 |
| Compression set (%) | | | 35 | 65 | 41 | 45 | 52 | 25 |
| Stain of photosensitive member | | | ○ | ○ | ○ | Δ | X | X |

TABLE 2-1-continued

| Components | Component (name(=trade name & maker)) | CE1 | CE2 | CE3 | CE4 | CE5 | CE6 |
|---|---|---|---|---|---|---|---|
| Cost | | ○ | Δ | ○ | ○ | ○ | ○ |
| Resistance to water (ΔV(distilled water) (%)/determination) | | 23/○ | 42/○ | 32/○ | 33/○ | 45/○ | 252/X | where CE denotes comparison example.

The numerical values shown in each table indicate parts by weight. The abbreviation EP denotes epichlorohydrin. EO denotes ethylene oxide. AGE denotes allyl glycidyl ether. PO denotes propylene oxide. The abbreviation Mn denotes number-average molecular weight. Mw denotes weight-average molecular weight. In each table, vulcanizing accelerator 1 consists of dibenzothiazolyl sulfide. Vulcanizing accelerator 2 consists of tetramethylthiuram monosulfide. Vulcanizing accelerator 3 consists of di-olto-trilguanidine. Vulcanizing agent 2 consists of ethylene thiourea. Vulcanizing agent 3 consists of 2-di-n-butylamino-4,6-dimelcapto-s-triazine.

A trial product obtained by the polymerization described in Japanese Patent Application Laid-Open No. 2000-63656 was used as the epichlorohydrin rubber.

Figure 3:
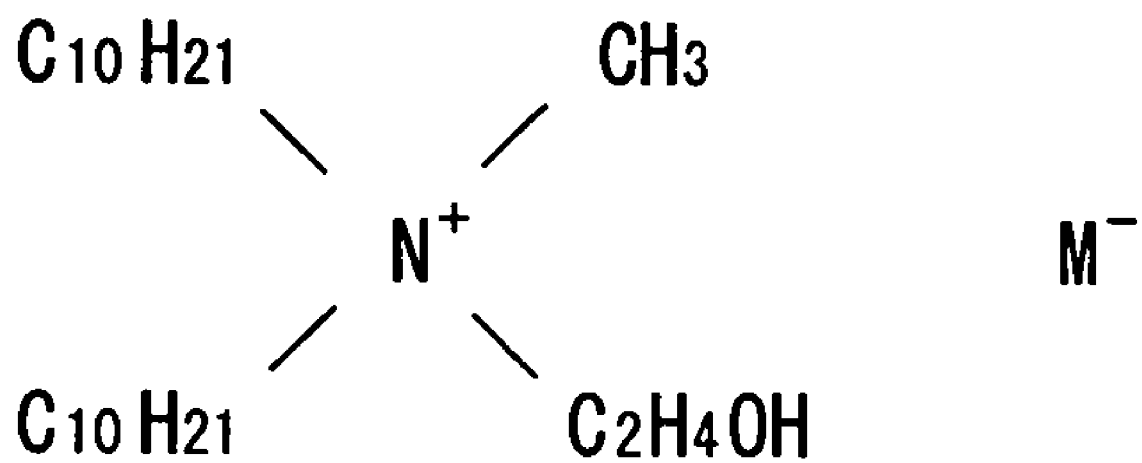
FIG. 3 shows the structure of non-chlorine quaternary ammonium salt used in a comparison example.
Figure 4:
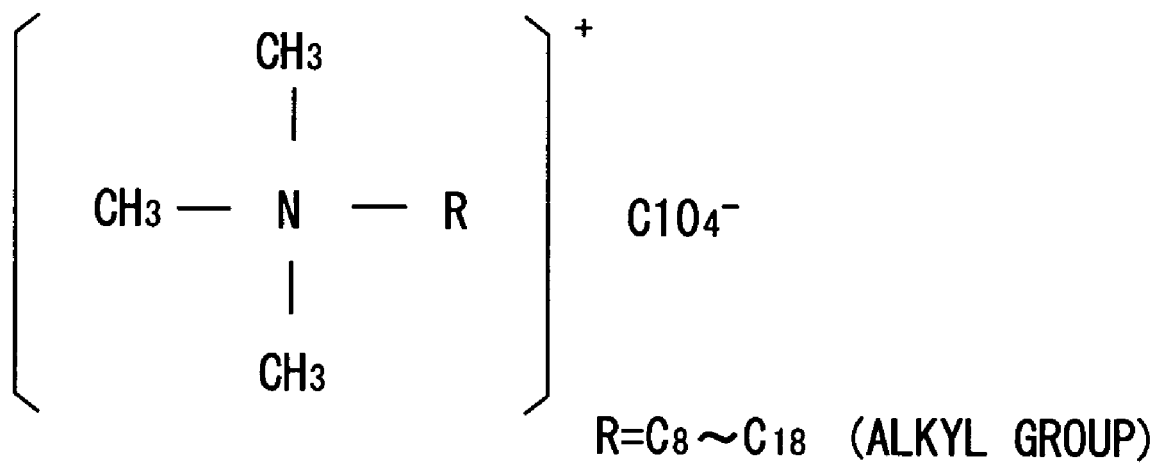
FIG. 4 shows the structure of quaternary ammonium perchlorate used in a comparison example.

In table 2, the non-chlorine ammonium salt is quaternary ammonium salt of gluconic acid having the structure shown in FIG. 3. The quaternary ammonium perchlorate is quaternary ammonium salt shown in FIG. 4. The high-performance ionic-conductive additive consists of lithium-bis(trifluoromethanesulfonyl)imide dissolved in 20 wt % of dibutoxyethoxyethyl adipate.

The lithium-bis(trifluoromethanesulfonyl)imide in table 2 was synthesized by the conventional method described in Japanese Patent Application Laid-Open No. 2001-288193 was used.

More specifically, an elastomer composition taken out from a kneader that kneaded the components mixed at the mixing ratio shown in table 1 and 2 was supplied to an extruder having an inner diameter of φ 60 mm to extrude it as a hollow tube. The raw rubber tube was cut to a proper size and vulcanized at 160° C. for 15–70 minutes to obtain a vulcanized rubber tube.

A cylindrical shaft having the same configuration as that of the shaft of the charging roller mounted on a copying apparatus IMAGIO MF2730 produced by Ricoh was prepared. After a hot-melt adhesive agent was applied to the shaft, the shaft was inserted into the vulcanized rubber tube and bonded thereto. The surface of the rubber tube was polished to obtain the conductive rubber roller of each of the examples and the comparison examples having the predetermined size. The dimension of each conductive rubber roller had an outer diameter of 14 mmφ and an inner diameter (diameter of shaft) of 8 mmφ. The axial length of the conductive rubber roller was 317 mm which was equal to that of the charging roller mounted on the copying apparatus IMAGIO MF2730 produced by Ricoh.

EXAMPLES 1 THROUGH 11

As shown in table 1, each of the conductive elastomer composition of the example 1 through 10 contained the EP-EO-AGE terpolymer having the same copolymerization ratio (EP:EO:AGE=23:73:4) which falls in the range specified in the present invention. The conductive elastomer composition of the example 11 contained the EP-EO bipolymer (EP:EO=39:61).

In the examples 1 through 4 and 9 through 11, the lithium-bis(trifluoromethanesulfonyl)imide was used as the anion-containing salt having the fluoro group (F—) and the sulfonyl group (—SO$_2$—). In the examples 5 through 7, lithium trifluoromethanesulfonate was used. In the example 8, lithium-tris(fluoroalkylsulfonyl)methane was used.

The components of each example were mixed with one another at the mixing ratio shown in table 1 to obtain the conductive elastomer composition of each example.

COMPARISON EXAMPLE 1 THROUGH 6

As shown in table 2, the conductive elastomer composition of each of the comparison examples 1, 3, 4, and 5 contained the EP-EO-AGE terpolymer having the same copolymerization ratio as that of the example 1. The conductive elastomer composition of the comparison example 2 contained the EP-EO-AGE terpolymer (EP:EO:AGE=63:34.5:2.5). The conductive elastomer composition of the comparison example 6 contained the EO-PO-AGE terpolymer (EO:PO:AGE=90:4:6).

The conductive elastomer composition of each of the comparison examples 2 and 6 contained the lithium-bis(trifluoromethanesulfonyl)imide which is the anion-containing salt having the fluoro group (F—) and the sulfonyl group (—SO$_2$—).

The conductive elastomer composition of the comparison example 3 contained the non-chlorine quaternary ammonium salt. The conductive elastomer composition of the comparison example 4 contained the quaternary ammonium perchlorate. The conductive elastomer composition of the comparison example 5 contained the high-performance ionic-conductive additive.

The conductive elastomer composition of the comparison example 1 did not contain the ionic-conductive additive.

The components of each comparison example were mixed with one another at the mixing ratio shown in table 2 to obtain the conductive elastomer composition of each comparison example.

The following properties were measured on the conductive elastomer composition of each of the examples and the comparison examples. Tables 1 and 2 show the results in the lower portion thereof.

Measurement of Hardness

The hardness of the specimen for measuring the compression set of each conductive elastomer composition was measured by the durometer of type E specified in JIS K6253 by applying a load of 1000 g thereto.

Measurement of Volume Change

The volume change of each of the above-described slab sheets each having a size of 130 mm×130 mm×2 mm were measured at a constant temperature of 23° C. and a constant relative humidity of 55% by an ultra-high resistance microammeter R-8340 manufactured by Advance Test Corporation Inc. The measuring method conformed to the method of measuring the volume change (volume specific resistance) specified in JIS K6911. The applied voltage was 100V.

Tables 1 and 2 show the volume change of each slab sheet by common logarithm $\log_{10}R(\Omega\cdot cm)$.

Measurement of Compression Set

In accordance with "the permanent set testing methods for rubber, vulcanized or thermoplastic" specified in JIS K6262, the compression set of each specimen was measured at 70° C. for 24 hours. The compression rate was 25% of the thickness of the specimen.

The roller composed of the foam (solid specimen) has a large dimensional change if the compression set of the foam is not less than 30%. Thus the roller is unsuitable for practical use, although there is a small difference in an expansion rate and an expansion mode.

Test of Stain of Photosensitive Member

The slab sheets of the examples and the comparison examples were stored for two weeks at 32.5° C. and at a relative humidity of 90%, with the slab sheets pressed against a photosensitive member set in a cartridge (cartridge type C4127X) of a laser beam printer of Laser Jet 4050 type produced by Hulet Packard Inc. After each vulcanized rubber slab sheet was removed from the photosensitive member, halftone printing was carried out by the printer accommodating the photosensitive member. Whether or not printed sheets of paper were stained was checked with the naked eye to make evaluation of the slab sheets by the following three criteria:

○: Printed paper was not stained with the naked eye.

Δ: Low degree of stain (when five sheets of paper were printed, stain was hardly visible and thus there is no problem in use).

X: High degree of stain (when not less than five sheets of paper were printed, stain was visible with the naked eye)

X: High degree of stain (when 11 or more sheets of paper were printed, stain could be recognized with the eye)

Examination of Resistance to Water

The volume change of the slab sheet of each of the examples and the comparison examples having a size of 130 mm×130 mm×2 mm was measured by immersing it in distilled water having a temperature 40±1° C. for 22±0.25 hours in accordance with the method specified in JIS K6258. Based on obtained values, the resistance to water of each slab sheet was determined as follows:

The slab sheet having a volume change less than 50% was rated as ○ (no problem in resistance to water) and not less than 50% was rated as X (unfavorable in resistance to water).

The electric resistance value of the roller of each of the examples and comparison examples was measured.

Measurement of Electric Resistance Value of Roller

Figure 5:
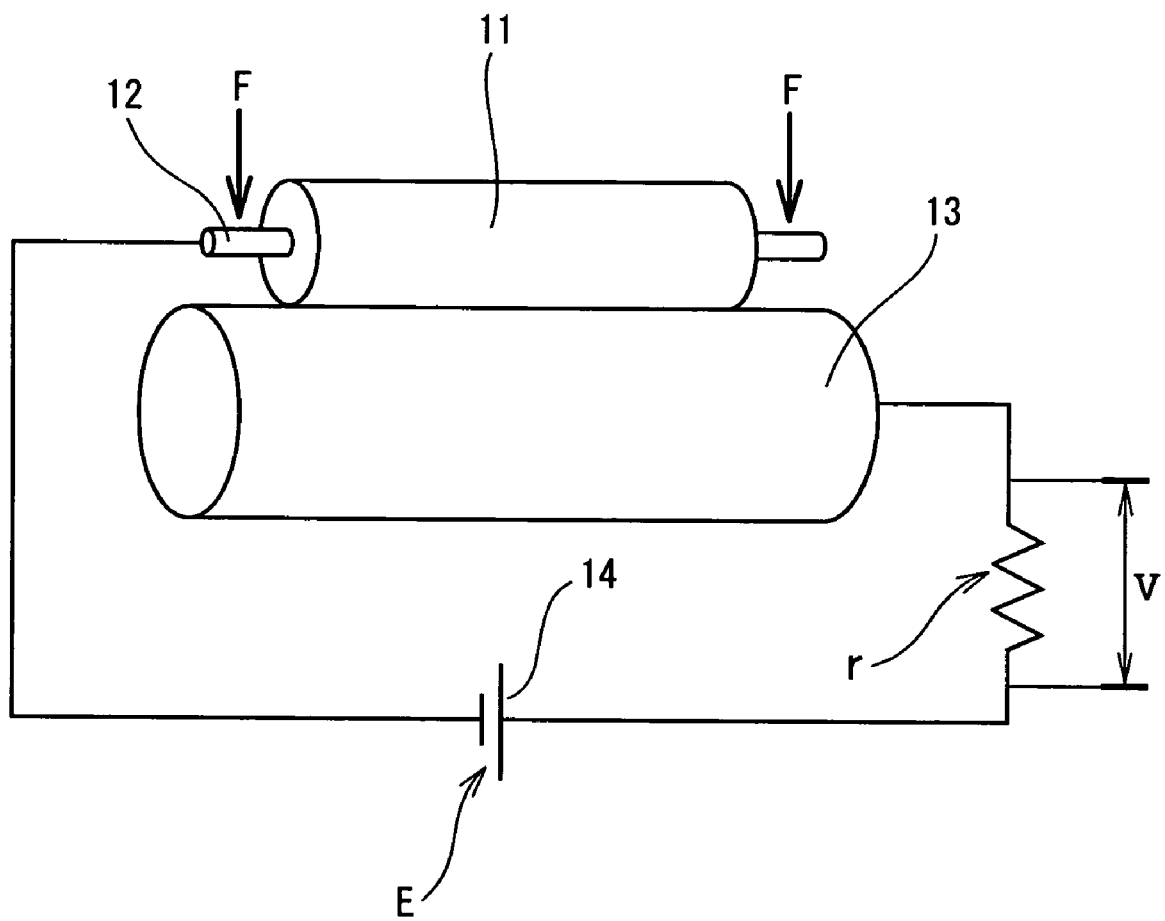
FIG. 5 is a schematic view showing an apparatus for measuring an electric resistance value of a conductive roller.

As shown in FIG. 5, a conductive roller 11 having a core metal 12 inserted therethrough was mounted on an aluminum drum 13 having φ30 mm, with the conductive roller 11 in contact with the aluminum drum 13. The leading end of a conductor, having an internal electric resistance of r (100Ω), which was connected to the positive side of a power source 14 was connected to one end surface of the aluminum drum 13. The leading end of the conductor connected to the negative side of the power source 14 was connected to one end surface of the conductive roller 11. Supposing that a voltage applied to the apparatus is E, the electric resistance R of the conductive roller 11 is: $R=r\times E/(V-r)$. Because the term of (−r) is regarded as being slight, $R=r\times E/V$. A load F of 500 g was applied to both ends of the core metal 2. The conductive roller 11 was rotated at 30 rpm. The applied voltage E was the above-described voltage 100V. The detected voltage V was measured at 100 times during four seconds. The electric resistance R was computed by using the above equation. The average of resistance values was set as the electric resistance of the conductive roller 11. Tables 1 and 2 show the resistance value of each conductive roller 11 by common logarithm $\log_{10}R\Omega$.

Cost

The material cost of each example and comparison example per volume was computed. The material cost of the example 4 was rated as Δ (fair). The material cost higher than the material cost Δ by not less than 10% was rated as X (unsuitable). The material cost lower than the cost Δ by not less than 10% was rated as ○ (good). Table 1 and 2 show the results. The material cost higher or lower than the material cost Δ of the example 4 by less than 10% was rated as Δ (fair).

As indicated in table 1, the conductive elastomer composition of the example 1 contained two parts by weight of the lithium-bis(trifluoromethanesulfonyl)imide for 100 parts by weight of the EP-EO-AGE terpolymer having the copolymerization ratio which falls in the range specified in the present invention, the vulcanizing accelerator consisting of sulfur and thiazole, and the vulcanizing accelerator consisting of thiuram. Therefore the conductive elastomer composition had a low volume specific resistance value, namely, $10^{6.6}$ ($\Omega\cdot cm$) and a proper compression set and hardness suitable for practical use. The rubber roller did not stain the photosensitive member, and the material cost was rated as ○. Thus it was confirmed that the rubber roller of the example 1 was superior in its properties. The volume change of the slab sheet of the example 1 was 30% when it was measured by immersing it in distilled water having a temperature 40±1° C. for 22±0.25 hours in accordance with the method specified in JIS K6258. Thus the slab sheet was rated as ○. That is, the conductive elastomer composition of the example had no problem in its resistance to water.

The conductive elastomer composition of the example 2 is different from that of the example 1 in that the conductive elastomer composition of the example 2 contained 11 parts by weight of the lithium-bis(trifluoromethanesulfonyl)imide for 100 parts by weight of the EP-EO-AGE terpolymer. Therefore the conductive elastomer composition had a low volume specific resistance value, namely, $10^{6.3}$ ($\Omega\cdot cm$) and a proper compression set and hardness for practical use. The rubber roller did not stain the photosensitive member. Thus it was confirmed that the rubber roller of the example 2 was superior in its properties, although the material cost was rated as Δ. Similarly to the example 1, the slab sheet was rated as ○. That is, the conductive elastomer composition of the example 2 had no problem in its resistance to water.

The conductive elastomer composition of the example 3 is different from that of the example 1 in that in the conductive elastomer composition of the example 3 contained thiourea derivatives and guanidine used in combination as the vulcanizing accelerator. The conductive elastomer composition had a low volume specific resistance value, namely, $10^{6.4}$ ($\Omega\cdot cm$) and a low compression set and a proper hardness suitable for practical use. Thus it was confirmed that the conductive elastomer composition of the example 3 was excellent. Further the rubber roller did not stain the photosensitive member. The material cost was rated as ○. Thus it was confirmed that the rubber roller had superior properties. The slab sheet made of the conductive elastomer composition had no problem in its resistance to water.

The conductive elastomer composition of the example 4 is different from that of the example 3 in that the conductive elastomer composition of the example 4 contained 11 parts by weight of the lithium-bis(trifluoromethanesulfonyl)imide for 100 parts by weight of the EP-EO-AGE terpolymer. The conductive elastomer composition had a very low volume specific resistance value, namely, $10^{6.2}$ ($\Omega\cdot cm$) and a low compression set and a proper hardness suitable for practical use. Thus the conductive elastomer composition of the example 4 was excellent. Further the rubber roller did not stain the photosensitive member, although the material cost was rated as $\Delta$. Thus it was confirmed that the rubber roller had superior properties. The sheet made of the conductive elastomer composition had no problem in its resistance to water.

The conductive elastomer composition of the example 5 is different from that of the example 2 in that instead of the lithium-bis(trifluoromethanesulfonyl)imide, the conductive elastomer composition of the example 5 contained 11 parts by weight of lithium trifluoroalkylmethanesulfonate for 100 parts by weight of the EP-EO-AGE terpolymer. The conductive elastomer composition had a low volume specific resistance value, namely, $10^{6.7}$ ($\Omega\cdot cm$) and a proper compression set and hardness suitable for practical use. The rubber roller did not stain the photosensitive member. The material cost was rated as $\bigcirc$. Thus it was confirmed that the rubber roller was superior in its properties. The sheet made of the conductive elastomer composition had no problem in its resistance to water.

The conductive elastomer composition of the example 6 is different from that of the example 4 in that instead of the lithium-bis(trifluoromethanesulfonyl)imide, the conductive elastomer composition of the example 6 contained 11 parts by weight of lithium trifluoroalkylmethanesulfonate for 100 parts by weight of the EP-EO-AGE terpolymer. The conductive elastomer composition had a low volume specific resistance value, namely, $10^{6.5}$ ($\Omega\cdot cm$) and a very low compression set and hardness suitable for practical use. The rubber roller did not stain the photosensitive member. The material cost was rated as $\bigcirc$. Thus it was confirmed that the rubber roller was superior in its properties because. The sheet made of the conductive elastomer composition had no problem in its resistance to water.

The conductive elastomer composition of the example 7 is different from that of the example 6 in that the conductive elastomer composition of the example 7 contained an anion-adsorbing agent. The conductive elastomer composition had a low volume specific resistance value, namely, $10^{6.2}$ ($\Omega\cdot cm$) and a very low compression set and hardness suitable for practical use. The rubber roller did not stain the photosensitive member. The material cost was rated as $\bigcirc$. Thus it was confirmed that the rubber roller was superior in its properties. The sheet made of the conductive elastomer composition had no problem in its resistance to water.

The conductive elastomer composition of the example 8 is different from that of the example 1 in that instead of the lithium-bis(trifluoromethanesulfonyl)imide, the conductive elastomer composition of the example 8 contained two parts by weight of lithium-tris(trifluoromethanesulfonyl)methane for 100 parts by weight of the EP-EO-AGE terpolymer. The conductive elastomer composition had a very low volume specific resistance value, namely, $10^{6.2}$ ($\Omega\cdot cm$) and a low compression set and a proper hardness suitable for practical use. Thus it was confirmed that the conductive elastomer composition of the example 8 was excellent. Further the rubber roller did not stain the photosensitive member, although the material cost was rated as $\Delta$. Thus it was confirmed that the rubber roller had superior properties. The slab sheet made of the conductive elastomer composition had no problem in its resistance to water.

The conductive elastomer composition of the example 9 is different from that of the examples 1 and 3 in that the conductive elastomer composition of the example 9 contained sulfur and thiourea derivatives used in combination as the vulcanizing agent and the thiazole and thiuram used in combination as the vulcanizing accelerator. The conductive elastomer composition had a low volume specific resistance value, namely, $10^{6.7}$ ($\Omega\cdot cm$) and a low compression set and a proper hardness suitable for practical use. Thus the conductive elastomer composition of the example 9 was excellent. Further the rubber roller did not stain the photosensitive member. The material cost was rated as $\bigcirc$. Thus it was confirmed that the rubber roller composed of the conductive elastomer composition had superior properties. The slab sheet made of the conductive elastomer composition had no problem in its resistance to water.

The conductive elastomer composition of the example 10 is different from that of the example 1 in that it contained sulfur and thiourea derivatives used in combination as the vulcanizing agent and thiazole and thiuram used in combination as the vulcanizing accelerator. The conductive elastomer composition had a low volume specific resistance value, namely, $10^{6.6}$ ($\Omega\cdot cm$) and a low compression set and a proper hardness suitable for practical use. Thus the conductive elastomer composition of the example 10 was excellent. Further the rubber roller did not stain the photosensitive member. The material cost was rated as $\bigcirc$. Thus it was confirmed that the rubber roller composed of the conductive elastomer composition had superior properties. The sheet made of the conductive elastomer composition had no problem in its resistance to water.

The conductive elastomer composition of the example 11 is different from that of the example 3 in that instead of the EP-EO-AGE terpolymer used in the examples 1 through 10, the conductive elastomer composition of the example 11 contained 100 parts by weight of an EP-EO bipolymer (EP:EO=39:61) which fell within the preferable range of the copolymerization ratio. The conductive elastomer composition had a low volume specific resistance value, namely, $10^{6.7}$ ($\Omega\cdot cm$) and a low compression set and a proper hardness suitable for practical use. Thus the conductive elastomer composition of the example 11 was excellent. Further the rubber roller did not stain the photosensitive member. The material cost was rated as $\bigcirc$. Thus it was confirmed that the rubber roller composed of the conductive elastomer composition had superior properties. The slab sheet made of the conductive elastomer composition had no problem in its resistance to water.

In each of the examples 1 through 11, the conductive elastomer composition had a volume change not more than $10^{6.9}$($\Omega\cdot cm$) when the volume change was measured at a voltage of 100V applied thereto in accordance with the method specified in JIS K6911. The conductive elastomer composition had a compression set not more than 30% when the compression set was measured at a temperature of 70° C. for 24 hours at a compressibility ratio of 25% in accordance with "the permanent set testing methods for rubber, vulcanized or thermoplastic" specified in JIS K6262. The conductive elastomer composition had a hardness not more than 75 degrees when the hardness was measured by the durometer of type E. Further the rubber roller did not stain the photosensitive member and the material cost was rated as $\bigcirc$. Thus it was confirmed that the rubber roller of each of the examples 1 through 11 had superior properties.

As the example 7 shows, the conductive elastomer composition containing the anion-adsorbing agent added to the lithium trifluoroalkylmethanesulfonate has a lower volume change lower than the conductive elastomer composition not containing the anion-adsorbing agent. The effect of reducing the volume change obtained by the addition of the anion-adsorbing agent is similar to that of reducing the volume change obtained by the use of a large amount of the lithium-bis(trifluoromethanesulfonyl)imide. Therefore the conductive elastomer composition of the example 7 is costly advantageous.

As shown in table 2, the conductive elastomer composition of the comparison example 1 is different from that of the examples 1, 2, 5, and 8 in that the conductive elastomer composition of the comparison example 1 did not contain the anion-containing salt having the fluoro group (F—) and the sulfonyl group (—SO$_2$—). The conductive elastomer composition had a large volume specific resistance value, namely, more than $10^{6.9}$ Ω·cm. The conductive elastomer composition had a compression set value larger than 30%. Thus the conductive elastomer composition was inappropriate for practical use.

The conductive elastomer composition of the comparison example 2 is different from that of the example 2 in that the copolymerization ratio of the EP-EO-AGE terpolymer was out of the preferable range specified in the present invention. Although the conductive elastomer composition contained 11 parts by weight of the lithium-bis(trifluoromethanesulfonyl)imide, the conductive elastomer composition had a large volume specific resistance value, namely, more than $10^{6.9}$ Ω·cm. The material cost of the conductive elastomer composition was rated as Δ. The conductive elastomer composition had a very high compression set.

The conductive elastomer composition of the comparison example 3 is different from that of the examples 1, 2, 5, and 8 in that the conductive elastomer composition of the comparison example 3 contained a non-chlorine ammonium salt instead of the anion-containing salt having the fluoro group (F—) and the sulfonyl group (—SO$_2$—). The conductive elastomer composition had a large volume specific resistance value, namely, more than $10^{6.9}$ Ω·cm. Further the conductive elastomer composition had a considerably high compression set.

The conductive elastomer composition of the comparison example 4 is different from that of the examples 1, 2, 5, and 8 in that the conductive elastomer composition of the comparison example 4 contained ammonium perchlorate instead of the anion-containing salt having the fluoro group (F—) and the sulfonyl group (—SO$_2$—). The conductive elastomer composition had a considerably high compression set and was inappropriate for practical use.

The conductive elastomer composition of the comparison example 5 is different from that of the examples 1, 2, 5, and 8 in that the anion-containing salt having the fluoro group (F—) and the sulfonyl group (—SO$_2$—) was not added to the ionic-conductive elastomer component, but was used in the form of a high-performance ionic-conductive additive in which the anion-containing salt having the fluoro group (F—) and the sulfonyl group (—SO$_2$—) was dispersed in a medium consisting of a low molecular weight compound. The conductive elastomer composition had a high compression set. Thus the rubber roller composed of the conductive elastomer composition was inappropriate. The rubber roller stained the photosensitive member. Thus the conductive roller and the conductive belt composed of the conductive elastomer composition were inappropriate for practical use.

The conductive elastomer composition of the comparison example 6 is different from that of the example 1 in that the copolymerization ratio among the EP-EO-AGE terpolymer was EP:PO:AGE=90:4:6. The conductive elastomer composition had a proper volume specific resistance value of $10^{6.7}$ Ω·cm. But the conductive elastomer composition had a very high hardness and stained the photosensitive member. Thus the conductive elastomer composition is inappropriate for practical use. The slab sheet composed of the conductive elastomer composition had a problem in its resistance to water.

A foaming agent was added to the components of some of the examples to form the foams 1 through 6 composed of the conductive elastomer composition shown in table 3.

To form the foams 1 through 6, the same EP-EO-AGE terpolymer as that contained in the conductive elastomer composition of the example 1 was used as the base component. Two parts by weight of the anion-containing salt having the fluoro group (F—) and the sulfonyl group (—SO$_2$—) (lithium-bis(trifluoromethanesulfonyl)imide), 7.5 parts by weight of the foaming agent, and additives shown in table 3 were added to the EP-EO-AGE terpolymer. The components were kneaded in a manner similar to that of the example 1 to obtain the conductive elastomer composition of each of the foams 1 through 6. As the foaming agent, 4,4'-oxybis(benzene sulfonyl hydrazide) was used.

TABLE 3

| Components | Component (name(=trade name & maker)) | | Foam 1 | Foam 2 | Foam 3 |
|---|---|---|---|---|---|
| Epichlorohydrin rubber 1 (EP:EO:AGE = 23:73:4, Mn = 130000, Mw = 580000) | (Trial product) | | 100 | 100 | 100 |
| Inorganic filler 1 | Calcium carbonate light | Maruo Calcium Kabushiki Kaisha | 20 | 20 | 20 |
| Hydrotalcite-like compound | DHT-4A-2 | Kyowa Kagaku Kogyo Kabushiki Kaisha | 3 | 3 | 3 |
| Magnesium oxide | Magsarat 150ST | Kyowa Kagaku Kogyo Kabushiki Kaisha | | | |
| Zinc oxide | Two kinds of zinc oxide | Mitsui Kinzoku Kabushiki Kaisha | 5 | 5 | 5 |
| Stearic acid | 4931 | Unichema Australia | 1 | 1 | 1 |
| Lithium-bis (trifluoromethanesulfonyl) imide | | | 2 | 2 | 2 |
| Foaming agent | NeocelbonN#1000SW | Eiwa Kagaku Kogyo Kabushiki Kaisha | 7.5 | 7.5 | 7.5 |
| Vulcanizing agent 1 | Powdered sulfur | Tsurumi Kagaku Kogyo Kabushiki Kaisha | 1.5 | 1.00 | 0.50 |
| Vulcanizing accelerator 1 | Nocceler DM | Ouchi Shinko Kagaku Kogyo Kabushiki Kaisha | 1.5 | 1.00 | 0.50 |
| Vulcanizing accelerator 2 | Nocceler TS | Ouchi Shinko Kagaku Kogyo Kabushiki Kaisha | 0.5 | 0.33 | 0.17 |
| Vulcanizing agent 2 | Accel 22-S | Kawaguchi Kagaku Kogyo Kabushiki Kaisha | | 0.67 | 1.33 |
| Vulcanizing accelerator 3 | Nocceler DT | Ouchi Shinko Kagaku Kogyo | | 0.57 | 1.13 |
| Vulcanizing agent 3 | Actor BSH | Kawaguchi Kagaku Kogyo Kabushiki Kaisha | | | |

TABLE 3-continued

| Components | Component (name(=trade name & maker)) | | Foam 4 | Foam 5 | Foam 6 |
|---|---|---|---|---|---|
| Epichlorohydrin rubber 1 (EP:EO:AGE = 23:73:4, Mn = 130000, Mw = 580000) | (Trial product) | | 100 | 100 | 100 |
| Inorganic filler 1 | Calcium carbonate light | Maruo Calcium Kabushiki Kaisha | 20 | 20 | 20 |
| Hydrotalcite-like compound | DHT-4A-2 | Kyowa Kagaku Kogyo Kabushiki Kaisha | 3 | | |
| Magnesium oxide | Magsarat 150ST | Kyowa Kagaku Kogyo Kabushiki Kaisha | | 3 | 3 |
| Zinc oxide | Two kinds of zinc oxide | Mitsui Kinzoku Kabushiki Kaisha | 5 | 5 | 5 |
| Stearic acid | 4931 | Unichema Australia | 1 | 1 | 1 |
| Lithium-bis (trifluoromethanesulfonyl) imide | | | 2 | 2 | 2 |
| Foaming agent | NeocelbonN#1000SW | Eiwa Kagaku Kogyo Kabushiki Kaisha | 7.5 | 7.5 | 7.5 |
| Vulcanizing agent 1 | Powdered sulfur | Tsurumi Kagaku Kogyo Kabushiki Kaisha | | | 1.00 |
| Vulcanizing accelerator 1 | Nocceler DM | Ouchi Shinko Kagaku Kogyo Kabushiki Kaisha | | | 1.00 |
| Vulcanizing accelerator 2 | Nocceler TS | Ouchi Shinko Kagaku Kogyo Kabushiki Kaisha | | 1.65 | 0.8 |
| Vulcanizing agent 2 | Accel 22-S | Kawaguchi Kagaku Kogyo Kabushiki Kaisha | 2.0 | | |
| Vulcanizing accelerator 3 | Nocceler DT | Ouchi Shinko Kagaku Kogyo | 1.7 | | |
| Vulcanizing agent 3 | Actor BSH | Kawaguchi Kagaku Kogyo Kabushiki Kaisha | | 3.18 | 1.06 |

The foam 1 contained the chemical foaming agent added to the components of the example 1. Sulfur (vulcanizing agent 1) was used as the vulcanizing agent.

The foam 2 contained the chemical foaming agent added to the components of the example 9. Sulfur (vulcanizing agent 1) and thiourea derivatives (vulcanizing agent 2) were used as the vulcanizing agent.

The foam 3 was similar to the foam 2, but had a smaller amount of the sulfur and the thiourea derivatives.

The foam 4 contained the chemical foaming agent added to the components of the example 3. Thiourea derivatives were used as the vulcanizing agent.

The foam 5 contained the chemical foaming agent added to the components of the example 10. Triazine derivatives was used as the vulcanizing agent.

The foam 6 contained the chemical foaming agent added to the components of the example 10. The sulfur and the triazine derivatives were used as the vulcanizing agent.

Figure 6:
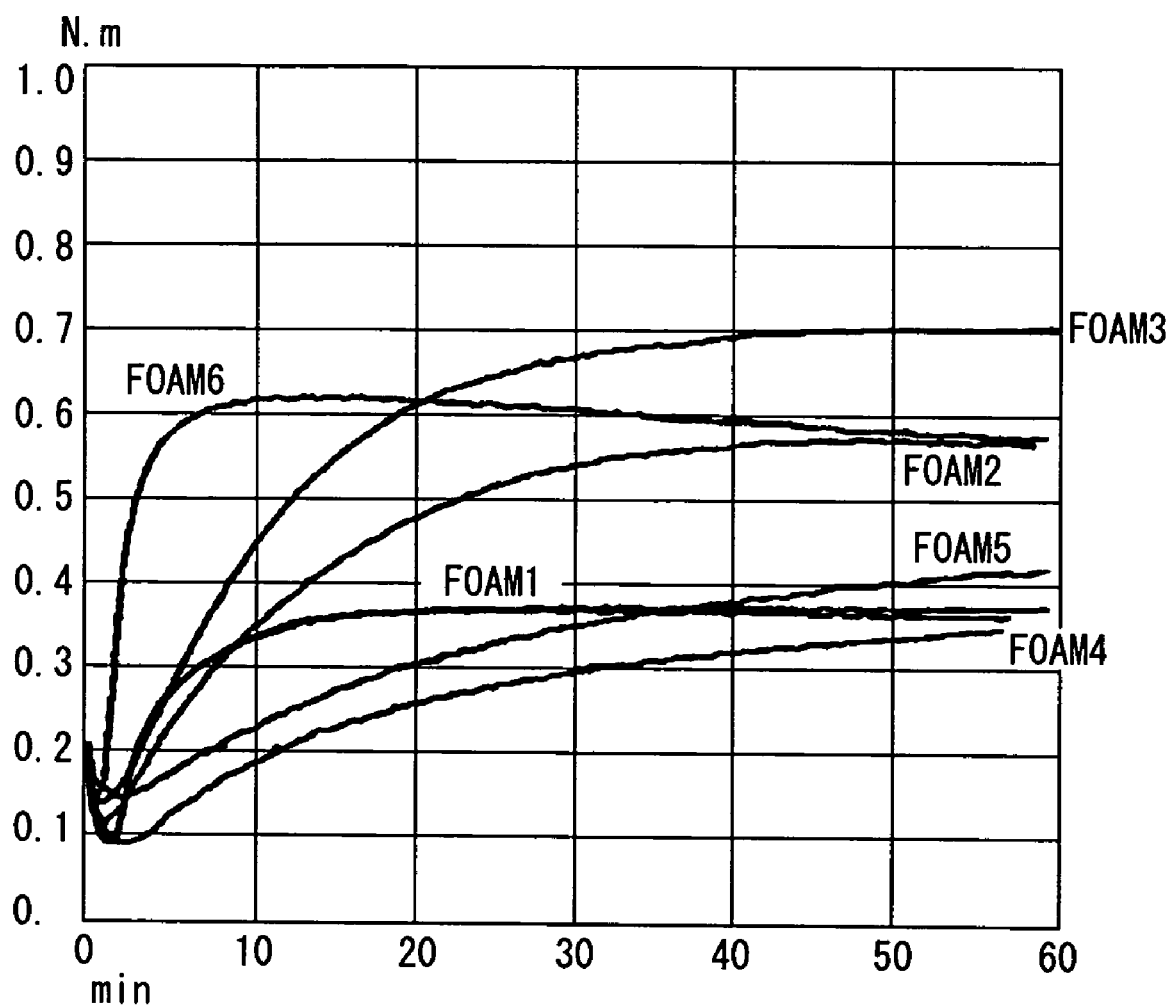
FIG. 6 shows vulcanization curves of foams 1 through 6 obtained by a Curelastometer.

An optimum amount of the foams 1 through 6 were sampled in an unvulcanized state to obtain a rubber specimen thereof. Thereafter in accordance with "Die vulcanization test A-method" of "vulcanization test by using vibration type vulcanization testing machine" of JIS standard, a sine wave, not so destructive as to destroy the rubber specimen, which has a low amplitude (1° in the present invention) was applied to the rubber specimen. A torque transmitted to an upper die from the rubber specimen was measured. Vulcanization curves shown in FIG. 6 were obtained. The temperature was set to 160° C.

As shown in table 6, it was confirmed that the foams 2 and 3 that contained the sulfur and the thiourea derivatives as the vulcanizing agent and the foam 6 which contained the sulfur and the triazine derivatives as the vulcanizing agent were much higher in the crosslinking density and in the vulcanizing speed than the foam 1 which contained only the sulfur as the vulcanizing agent, the foam 4 which contained only the thiourea derivatives as the vulcanizing agent, and the foam 5 which contained only the triazine derivatives as the vulcanizing agent.

As apparent from the foregoing description, according to the present invention, the anion-containing salt having the fluoro group (F—) and the sulfonyl group (—$SO_2$—) is added to the ionic-conductive elastomer component providing uniform and stable electric resistance. Therefore the conductive elastomer composition is capable of obtaining a very high conduction degree. Thus although the conductive elastomer composition is ionic-conductive, it has a very low volume specific resistance value and a low compression set. Further the conductive elastomer composition has a hardness suitable for composing the conductive roller and the conductive belt.

The epichlorohydrin, the ethylene oxide, the allyl glycidyl ether are copolymerized at the predetermined ratio. The predetermined parts by weight of the anion-containing salt having the fluoro group (F—) and the sulfonyl group (—$SO_2$—) is added to the terpolymer of the epichlorohydrin-ethylene oxide-allyl glycidyl ether. Thus it is possible to provide the conductive elastomer composition with a low volume change and use the conductive elastomer composition suitably at a normal temperature and humidity.

As apparent from the foregoing description, the conductive elastomer composition of the present invention has a low electric resistance which cannot be realized by the conventional one. Thus it can be used for various uses. More specifically, the charging roller, the development roller, the toner supply roller, the conductive belt, and the like composed of the conductive elastomer composition have small power consumption and contribute to formation of preferable images having uniform density. The conductive elastomer composition can be used suitably for composing the conductive roller and the conductive belt such as the charging roller, the development roller, the toner supply roller, the transfer belt, and the transfer roller for use in a color copying apparatus and a color printer. This is because the conductive elastomer composition has a comparatively low electric resistance. Therefore the present invention provides image-forming apparatuses such as the copying apparatus, the printer, the facsimile, and the like that have small power consumption and provide preferable and high-quality images having uniform density reliably for a long time.

Examples 12 and 13 and comparison examples 7 and 8 will be described in detail below.

Components shown in table 4 were kneaded to prepare the solid conductive rubber roller composed of the conductive elastomer composition of each of the examples 12 and 13 and comparison examples 7 and 8.

TABLE 4

| Components | Component (name=trade name & maker) | | E12 | E13 | CE7 | CE8 |
|---|---|---|---|---|---|---|
| Epichlorohydrin rubber 2 (EP:EO = 39:61) | Epichlomer D | Daiso Kabushiki Kaisha | 40 | 50 | 40 | |
| Epichlorohydrin rubber 3 (EP:EO:AGE = 63:34.5:2.5) | Epichlomer CG104 | Daiso Kabushiki Kaisha | | | | 100 |
| Acrylonitrile butadiene rubber | Nipol 401LL (NBR) | Zeon | 60 | | 60 | |
| Chloroprene rubber | Shoprene WRT(CR) | Showa Denko | | 50 | | |
| Inorganic filler 1 | Calcium carbonate light | Maruo Calcium Kabushiki Kaisha | 20 | 20 | 20 | 20 |
| Hydrotalcite-like compound | DHT-4A-2 | Kyowa Kagaku Kogyo Kabushiki Kaisha | 3 | 3 | 3 | 3 |
| Magnesium oxide | Magsarat 150ST | Kyowa Kagaku Kogyo Kabushiki Kaisha | | | | |
| Zinc oxide | Two kinds of zinc oxide | Mitsui Kinzoku Kabushiki Kaisha | 5 | 5 | 5 | 5 |
| Stearic acid | 4931 | Unichema Australia | 1 | | 1 | 1 |
| Lithium-bis (trifluoromethanesulfonyl) imide | | | 1 | 1 | | |
| Lithium trifluoromethanesulfonate | | | | | | |
| Lithium-tris (trifluoromethanesulfonyl) methane | | | | | | |
| Ion-adsorbing agent | | | | | | |
| Vulcanizing agent 1 | Powdered sulfur | Tsurumi Kagaku Kogyo Kabushiki Kaisha | 1.5 | 0.5 | 1.5 | 1.5 |
| Vulcanizing accelerator 1 | Nocceler DM | Ouchi Shinko Kagaku Kogyo Kabushiki Kaisha | 1.5 | 0.5 | 1.5 | 1.5 |
| Vulcanizing accelerator 2 | Nocceler TS | Ouchi Shinko Kagaku Kogyo Kabushiki Kaisha | 0.5 | 0.17 | 0.5 | 0.5 |
| Vulcanizing agent 2 | Accel 22-S | Kawaguchi Kagaku Kogyo Kabushiki Kaisha | | 1.33 | | |
| Vulcanizing accelerator 3 | Nocceler DT | Ouchi Shinko Kagaku Kogyo Kabushiki Kaisha | | 1.13 | | |
| Vulcanizing agent 3 | Actor BSH | Kawaguchi Kagaku Kogyo Kabushiki Kaisha | | | | |
| Hardness | | | 70 | 72 | 71 | 73 |
| Roller electric resistance | | | 6.0 | 5.2 | 7.0 | 7.1 |
| volume specific resistance | | | 8.0 | 6.9 | 8.9 | 8.9 |
| Compression set | | | 27 | 5.3 | 27 | 28 |
| Stain of photosensitive member | | | ◯ | ◯ | ◯ | ◯ |
| Durability | | | ◯ | ◯ | ◯ | ◯ | where E denotes example and where CE denotes comparison example.

The numerical values and abbreviations of table 4 are similar to those of tables 1 through 3. The conductive rubber roller, the property evaluation slab sheet, and the specimen of each of the examples 12 and 13 and comparison examples 7 and 8 were prepared in methods similar to those used in the examples 1 through 11 and the comparison examples 1 through 6.

EXAMPLES 12 AND 13

The conductive elastomer composition of the example 12 contained one part by weight of the anion-containing salt having the fluoro group (F—) and the sulfonyl group (—$SO_2$—) (lithium-bis(trifluoromethanesulfonyl)imide) added to 100 parts by weight of a mixture of the EP-EO bipolymer having the copolymerization ratio (EP:EO=39:61) falling in the range specified in the present invention and polar NBR, and the additives shown in table 4 having the mixing ratio shown in table 4.

The conductive elastomer composition of the example 13 contained one part by weight of the anion-containing salt having the fluoro group (F—) and the sulfonyl group (—$SO_2$—) (the lithium-bis(trifluoromethanesulfonyl)imide) added to 100 parts by weight of a mixture of the EP-EO bipolymer having the copolymerization ratio (EP:EO=39:61) falling in the range specified in the present invention and polar chloroprene rubber (CR), and the additives shown in table 4 having the mixing ratio shown in table 4.

COMPARISON EXAMPLES 7 AND 8

The conductive elastomer composition of the comparison example 7 contained 100 parts by weight of a mixture of the EP-EO bipolymer having the copolymerization ratio (EP:EO=39:61) falling in the range specified in the present invention and the polar NBR and the additives shown in table 4 having the mixing ratio shown in table 4. The conductive elastomer composition did not contain the anion-containing salt having the fluoro group (F—) and the sulfonyl group (—$SO_2$—).

The conductive elastomer composition of the comparison example 8 contained 100 parts by weight of the EP-EO-AGE terpolymer having the copolymerization ratio (EP:EO:AGE=63:34.5:2.5) not falling in the range specified in the present invention and the additives shown in table 4 having the mixing ratio shown in table 4. The conductive elastomer composition did not contain the anion-containing salt having the fluoro group (F—) and the sulfonyl group (—$SO_2$—).

The characteristics of the conductive elastomer composition of each of the examples 12 and 13 and comparison examples 7 and 8 were measured. Table 4 shows the results.

As indicated in table 4, the conductive elastomer composition of the example 12 contained one part by weight of the anion-containing salt having the fluoro group (F—) and the sulfonyl group (—$SO_2$—) (lithium-bis(trifluoromethanesulfonyl)imide) for 100 parts by weight of the mixture rubber containing 40 parts by weight of the EP-EO bipolymer having the copolymerization ratio (EP:EO=39:61) falling in the range specified in the present invention and 60 parts by weight of the polar NBR, the vulcanizing agent consisting of the sulfur, the accelerator consisting of the thiazole, and the vulcanizing accelerator consisting of thiuram. Therefore the conductive elastomer composition had a low volume specific resistance value, namely, $10^{8.0}$ (Ω·cm) and a proper compression set and hardness. The rubber roller did not stain the photosensitive member. Thus it was confirmed that the rubber roller was superior in its properties. Further the conductive elastomer composition was rated as ◯, namely, no problem in its resistance to water.

The conductive elastomer composition of the example 13 contained one part by weight of the anion-containing salt having the fluoro group (F—) and the sulfonyl group (—SO$_2$—) (the lithium-bis(trifluoromethanesulfonyl)imide) for 100 parts by weight of the mixture rubber containing 50 parts by weight of the EP-EO bipolymer having the copolymerization ratio (EP:EO=39:61) falling in the range specified in the present invention and 50 parts by weight of the polar CR. Therefore the conductive elastomer composition had a low volume specific resistance value, namely, $10^{6.9}$ (Ω·cm) and a proper compression set and hardness. The rubber roller did not stain the photosensitive member. Thus it was confirmed that the rubber roller was superior in its properties. Further the conductive elastomer composition was rated as ○, namely, no problem in its resistance to water.

The conductive elastomer composition of each of the examples 12 and 13 had a volume change not more than $10^{8.9}$(Ω·cm) when the volume change was measured at a voltage of 100V applied thereto in accordance with the method specified in JIS K6911. The conductive elastomer composition had a compression set not more than 30% when the compression set was measured at a temperature of 70° C. for 24 hours at a compressibility ratio of 25% in accordance with "the permanent set testing methods for rubber, vulcanized or thermoplastic" specified in JIS K6262. The conductive elastomer composition had a hardness not more than 75 degrees when the hardness was measured by the durometer of type E. Further the conductive elastomer composition of each of the examples 12 and 13 did not stain the photosensitive member and was thus excellent.

As indicated in table 4, the conductive elastomer composition of the comparison example 7 is different from that of the example 12 in that the conductive elastomer composition of the comparison example 7 did not contain the anion-containing salt having the fluoro group (F—) and the sulfonyl group (—SO$_2$—). The conductive elastomer composition had a large volume specific resistance value, namely, more than $10^{8.5}$Ω·cm. Thus the conductive elastomer composition was inappropriate for practical use.

The conductive elastomer composition of the comparison example 8 is different from that of the example 12 in that the conductive elastomer composition of the comparison example 8 contained 100 parts by weight of the elastomer component, namely, the EP-EO-AGE terpolymer (EP:EO:AGE=63:34.5:25) and did not contain the anion-containing salt having the fluoro group (F—) and the sulfonyl group (—SO$_2$—). The conductive elastomer composition had a large volume specific resistance value, namely, more than $10^{8.5}$Ω·cm. Thus the conductive elastomer composition was inappropriate for practical use.

Examples 14 through 16 and comparison examples 9 through 11 will be described in detail below.

Each of the roller of the examples 14 through 16 were formed by using the above-described method. The rollers of the examples 14 through 16 contained the same components, shown in table 4, as those of the examples 12 and 13. Each of the rollers of the comparison examples 9 through 11 was also prepared by using the above-described method. The rollers of the comparison examples 9 through 11 contained the same components, shown in tables 2 and 4, as those of the comparison examples 3 and 4. The roller had an outer diameter of 16 mmφ and an inner diameter (diameter of shaft) of 10 mmφ. The conductive elastomer composition composing the roller of the examples 14 and 15 and the comparison examples 9 and 10 contained 40 parts by weight of Hakuenka CC (produced by Shiraishi Calcium) for treatment of fatty acid. The conductive elastomer composition composing the roller of the example 16 and the comparison example 11 contained 50 parts by weight of weakly conductive carbon black (#15 produced by Asahi Carbon Kabushiki Kaisha).

The roller of each of the examples 14 through 16 and the comparison examples 9 through 11 was mounted on a shaft having an inner diameter of 10 mmφ and bonded to the shaft in an oven having a temperature of 160° C. Thereafter the end of the roller was shaped. Further the surface thereof was polished to 20 mmφ and a predetermined surface roughness. The roller of the examples 14 and 15 and the comparison examples 9 and 10 had a dielectric loss tangent of about 1.5. The roller of the example 16 and the comparison example 11 had a dielectric loss tangent of about 1.1. The dielectric loss tangent was measured at 100 Hz.

TABLE 5

| | E14 | E15 | CE9 | CE10 |
|---|---|---|---|---|
| Mixing | E12 | E12 | CE7 | CE3 |
| UV irradiation | 5 minutes × ¼ of circumferential surface | 5 minutes × ¼ of circumferential surface | Not irradiated | 5 minutes × ¼ of circumferential surface |
| Finish polishing | Polishing of roller surface | Mirror-like surface finish | Polishing of roller surface | Polishing of roller surface |
| Surface roughness Rz | 7.9 | 4.5 | 7.9 | 7.8 |
| Friction coefficient μ | 0.82 | 0.83 | 2.0 | 0.85 |
| Roller electric resistance | 6.2 With UV, Electric resistance ↑ | 6.2 With UV, Electric resistance ↑ | 7.2 | 6.0 With UV, Electric resistance ↑ |
| Evaluation by printing Epson LP2000C printed out 100 sheets of paper Print density <25% halftone> Charged amount <printed by white solid> (μC/g) | Appropriate −16.5 | Appropriate −18.0 | A little dark −15.8 | Small charged amount → Becomes dark Dark −14.0 |
| Evaluation of durability Printed out 3000 sheets of paper Wear of sealing portion Stability of halftone | Good Good | Good Excellent | Good Uneven (large electric resistance, poor toner-holding performance) | wear a little Good |
| Evaluation | ○ | ⊚ | Δ | Δ~○ |

TABLE 5-continued

|  | E16 | CE11 |
|---|---|---|
| Mixing | E13 | CE3 |
| UV irradiation | 5 minutes × ¼ of circumferential surface | 5 minutes × ¼ of circumferential surface |
| Finish polishing | Mirror-like surface finish | Polishing of roller surface |
| Surface roughness Rz | 4 | 4.5 |
| Friction coefficient μ | 0.80 | 0.82 |
| Roller electric resistance | 5.4 | 6.0 |
|  | With UV, Electric resistance ↑ | With UV, Electric resistance ↑ |
| Evaluation by printing | Appropriate | Appropriate |
| (Brother HL1440) printed out 100 sheets of paper Print density <25% halftone> Charged amount <printed by white solid> (μC/g) | +39.5 | +29.4 |
| Stability of halftone | Excellent | A little bad |
| Evaluation | ⊚ | ○~Δ | where E denotes example and where CE denotes comparison example.

After the surface of the roller of each of the examples 14 through 16 and the comparison examples 9 through 11 was washed with water, the surface of each roller was irradiated with ultraviolet rays to form an oxide layer thereon. An ultraviolet ray irradiator (produced by Sen Tokushu Kogen Kabushiki Kaisha, PL21-200) irradiated the surface of each roller with ultraviolet rays (184.9 nm and 253.7 nm) at an angle of 90 degrees in the circumferential direction thereof for a predetermined period of time, with the roller and an ultraviolet ray lamp spaced from each other at 10 cm. The roller was rotated at 90 degrees four times to form the oxide film on the entire peripheral surface (360 degrees) thereof. The roller of the examples 14 and 15 and the comparison examples 9 and 10 had a dielectric loss tangent of about 1.1. The roller of each of the example 16 and the comparison example 11 had a dielectric loss tangent of about 0.5. The dielectric loss tangent was measured at 100 Hz.

The following properties were measured on the conductive elastomer composition of each of the examples 14 through 16 and the comparison examples 9 through 11. Table 5 shows the results in the lower portion thereof. The electric resistance value of each roller was measured by using the above-described method.

Measurement of Dielectric Loss Tangent

Figure 7:
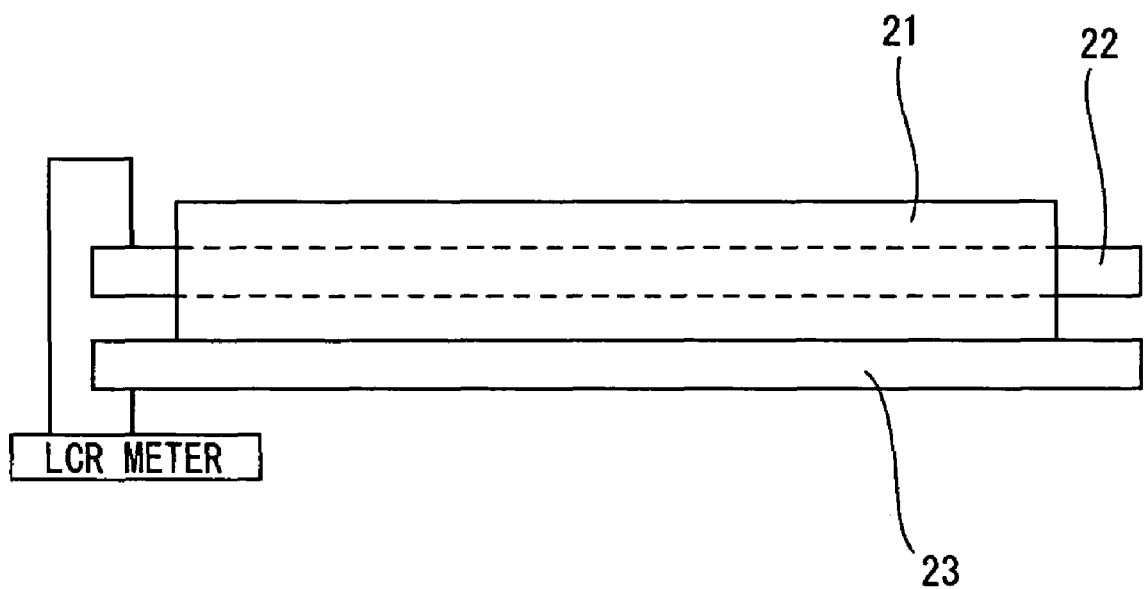
FIG. 7 is a schematic view showing a method of measuring the dielectric loss tangent of the conductive roller.

As shown in FIG. 7, an alternating voltage of 100 Hz to 100 kHz was applied to electrodes, namely, a shaft 22 and a metal plate 23 on which a rubber roller 21 was placed. An R (electric resistance) component and a C (capacitor) component were measured separately by an LCR meter (AG-4311B, manufactured by Ando Denki) at a temperature of 23° C. to 24° C. (room temperature). The dielectric loss tangent, the impedance, and the phase angle were found by using the following equation.

Dielectric loss tangent (tan δ)=$G/\omega C$ $G=1/R$

The dielectric loss tangent was found as $G/\omega C$ by modeling the electrical characteristic of one roller as a parallel equivalent circuit of the electric resistance component thereof and that of the capacitor component.

Measurement of Surface Roughness

The surface roughness Rz was measured in accordance with JIS B 0601 (1994).

Measurement of Friction Coefficient

Figure 8:
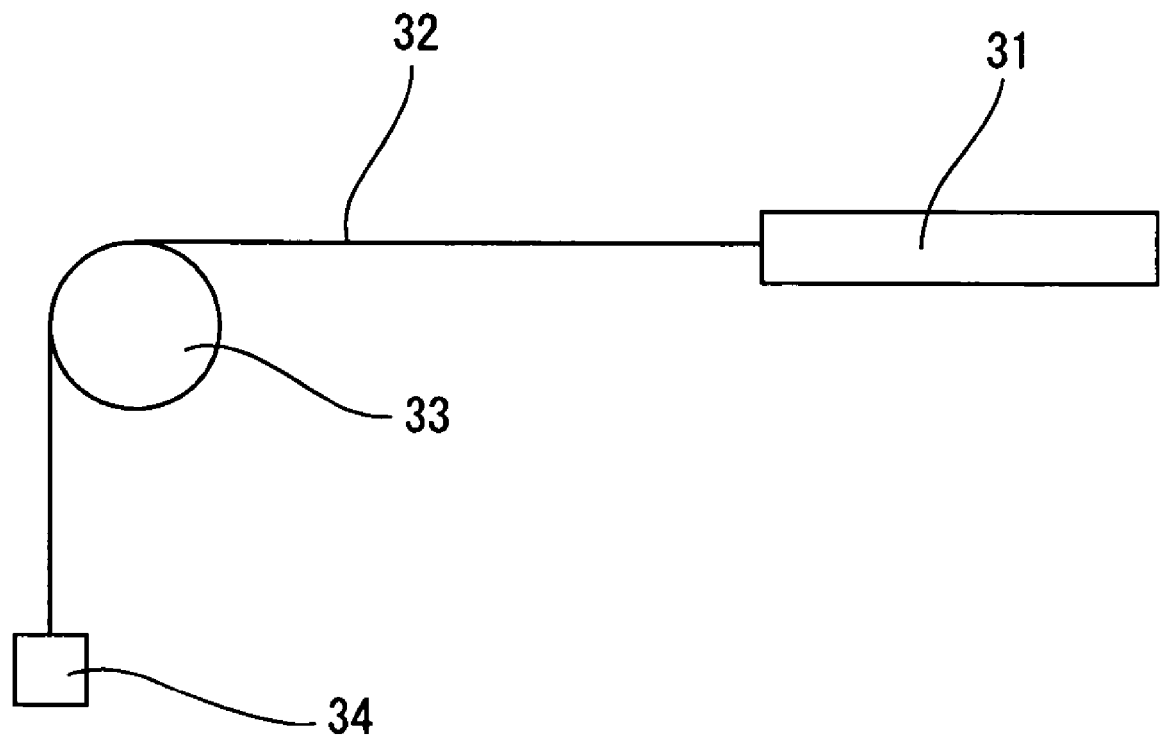
FIG. 8 is a schematic view showing a method of measuring the friction coefficient of the conductive roller.

As shown in FIG. 8, numerical values obtained by a measuring apparatus having a digital force gauge "Model PPX-2T" 31, a friction piece (OHP film commercially available) 32, a 20 g-weight 34, and a conductive rubber roller 33 was substituted into Euler's equations to compute the friction coefficient.

Printing Test

To examine adhesiveness of charged toner, electric uniformity of the charged toner, time stability (durability), i.e., to evaluate the performance of the rubber roller of each of the examples and the comparison examples, the rubber roller of the examples 14, 15 and that of each of the comparison examples 9, 10 were mounted on a printer LP2000C of non-contact type manufactured by Epson Inc., whereas the rubber roller of the example 16 and that of the comparison example 11 were mounted on a printer (HL1440 manufactured by Brother Industries, Inc.) of contact type to check formed images.

The quality of each image (initial image) was evaluated by the degree of unevenness of density thereof, when a 25% halftone image was formed on 100 sheets of paper. After printing was performed, toner disposed proximate to the photosensitive member was sucked by a charged quantity measuring apparatus to measure the charged quantity thereof and the weight of the sucked toner by a weight meter. The quantity of static electricity per weight was computed as the charged quantity (μC/g).

The durability of each rubber roller was evaluated as the stability degree of halftone by printing out 3000 (half of indicated number) sheets of paper before a toner box was empty. That is, the degree of wear of a sealing portion was checked, and the difference between the quality of an initial image and that of an image formed on 3000th paper was compared with each other.

The oxide layer was formed on the surface of the roller of each of the examples 14 through 16 by irradiating the surface thereof with ultraviolet rays to set the surface roughness Rz and the friction coefficient to the range specified in the present invention. Therefore each roller had a preferable electric resistance value and preferable performance in the printing test. There is a possibility of discharge in the printer of non-contact type when the electric resistance value of the roller is smaller than $10^5$. But each roller had a preferable electric resistance value. Thus no discharge occurred.

It has been found that the conductive roller of the present invention is applicable to printers of non-contact type and contact type.

On the other hand, the oxide layer was not formed on the surface of the roller of the comparison example 9. And the roller had a higher electric resistance value, because of the salt. So the roller did not have preferable performance in the printing test. Thus the evaluation was generally unfavorable.

The oxide layer was formed on the surface of the roller of each of the comparison examples 10 and 11. However, the components of the conductive elastomer composition of the comparison examples 10 and 11 were not included in the scope of the present invention. Thus the rollers did not preferable performance in the printing test. Thus the evaluation was generally unfavorable.

The results indicate that the conductive elastomer composition composed of the conductive elastomer composition containing the mixture rubber of the EP-EO bipolymer having the copolymerization ratio (EP:EO=39:61) and the polar CR and the anion-containing salt having the fluoro group (F—) and the sulfonyl group (—SO$_2$—) (the lithium-bis(trifluoromethanesulfonyl)imide) has a low volume specific resistance value. Thus the conductive roller can be suitably used as the development roller. Further the conductive rubber roller has a proper compression set and hardness. Furthermore the conductive rubber roller does not stain the photosensitive member and displays preferable characteristics in the printing test.

The invention claimed is:

1. A conductive elastomer composition comprising an ionic-conductive elastomer component, another elastomer component, and an anion-containing salt having a fluoro group (F—) and a sulfonyl group (—SO$_2$—),
said conductive elastomer composition having:
a volume charge not more than $10^{8.5}$(Ω·cm) when said volume charge is measured at a voltage of 100V applied thereto in accordance with the method specified in JIS K6911;
a compression set not more than 30% when said compression set is measured at a temperature of 70° C. for 24 hours at a compressibility ratio of 25% in accordance with "the permanent set testing methods for rubber, vulcanized or thermoplastic" specified in JIS K6262, and
wherein said conductive elastomer composition is a vulcanized rubber composition comprising:
epihalohydrin rubber, as said ionic-conductive elastomer component, which comprises epihalohydrin, ethylene oxide, and allyl glycidyl ether copolymerized at a ratio of 10 to 45 mol %, 55 to 80 mol %, and 0 to 10 mol % respectively; and
not less than 0.01 nor more than 20 parts by weight of said anion-containing salt having said fluoro group (F—) and said sulfonyl group (—SO$_2$—) for 100 parts by weight of an entire polymer component containing said ionic-conductive elastomer component.

2. The conductive elastomer composition according to claim 1, having a volume change less than 50% when said conductive elastomer composition is immersed in distilled water at 40±1° C. for 22±0.25 hours.

3. The conductive elastomer composition according to claim 1, wherein as said epihalohydrin rubber, epichlorohydrin rubber is used.

4. The conductive elastomer composition according to claim 1, wherein said anion-containing salt having said fluoro group (F—) and said sulfonyl group (—SO$_2$—) includes at least one salt selected from among a salt of bisfluoroalkylsulfonylimide, a salt of tris(fluoroalkylsulfonyl)methane, and a salt of fluoroalkylsulfonic acid.

5. The conductive elastomer composition according to claim 1, wherein a terpolymer of epichlorohydrin-ethylene oxide-allyl glycidyl ether is used singly or a mixture of chloroprene rubber and said terpolymer of said
epichlorohydrin-ethylene oxide-allyl glycidyl ether is used, and
said terpolymer of said epichlorohydrin-ethylene oxide-allyl glycidyl ether or said mixture is crosslinked with sulfur and thiourea derivatives in combination or with said sulfur and triazine derivatives in combination.

6. A conductive elastomer composition according to claim 1, having a dielectric loss tangent in a range from 0.1 to 1.5.

7. A conductive member composed of a conductive elastomer composition according to claim 1.

8. The conductive member according to claim 7, which is a conductive roller or a conductive belt.

9. The conductive member according to claim 8, wherein the conductive roller is a development roller.

10. A conductive member composed of a conductive elastomer according to claim 1, having a surface roughness Rz not less than 1 μm nor more than 8 μm; and a surface friction coefficient in a range from 0.1 to 1.5.

11. A conductive member composed of a conductive elastomer according to claim 1, having a surface made of an oxide film.

12. The conductive member according to claim 11, wherein said oxide film formed on said surface is formed by irradiating said surface with ultraviolet rays and/or ozone.

* * * * *